(12) United States Patent
Peng et al.

(10) Patent No.: US 10,091,566 B2
(45) Date of Patent: Oct. 2, 2018

(54) METHOD AND APPARATUS FOR VIRTUALIZING PASSIVE OPTICAL NETWORK, AND PASSIVE OPTICAL NETWORK VIRTUALIZATION SYSTEM

(71) Applicant: Huawei Technologies Co., Ltd., Shenzhen, Guangdong (CN)

(72) Inventors: Guikai Peng, Shenzhen (CN); Huafeng Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 14/964,280

(22) Filed: Dec. 9, 2015

(65) Prior Publication Data

US 2016/0088377 A1   Mar. 24, 2016

Related U.S. Application Data

(63) Continuation of application No. PCT/CN2013/077058, filed on Jun. 9, 2013.

(51) Int. Cl.
| | |
|---|---|
| *H04B 10/20* | (2006.01) |
| *H04Q 11/00* | (2006.01) |
| *H04L 12/46* | (2006.01) |
| *H04L 12/24* | (2006.01) |
| *H04L 12/28* | (2006.01) |

(52) U.S. Cl.
CPC ..... *H04Q 11/0067* (2013.01); *H04L 12/2885* (2013.01); *H04L 12/46* (2013.01); *H04L 41/0803* (2013.01); *H04L 41/0806* (2013.01); *H04L 12/2863* (2013.01); *H04Q 2011/0064* (2013.01); *H04Q 2011/0077* (2013.01); *H04Q 2011/0079* (2013.01)

(58) Field of Classification Search
CPC ................. H04J 14/00; H04Q 11/0067; H04Q 2011/0077; H04Q 2011/0079; H04L 12/2885; H04L 12/46; H04L 12/2863; H04L 41/0803; H04L 41/0806
USPC ...................... 398/45, 58, 63, 66, 70, 71, 72
See application file for complete search history.

(56) References Cited

U.S. PATENT DOCUMENTS

2007/0230481 A1   10/2007   Ikeda et al.
2008/0166127 A1   7/2008   Kazawa et al.
(Continued)

FOREIGN PATENT DOCUMENTS

| CN | 1878122 A | 12/2006 |
|---|---|---|
| CN | 101047583 A | 10/2007 |

(Continued)

*Primary Examiner* — M. R. Sedighian

(57) ABSTRACT

Embodiments of the present invention provide a method and an apparatus for virtualizing a passive optical network, and a passive optical network virtualization system. The method includes: receiving a virtualized passive optical network creation message, where the virtualized passive optical network creation message includes an ID of a to-be-created VPON and at least one wavelength flow identifier λ-flow ID; and establishing, according to the VPON ID and the at least one λ-flow ID, a communication connection relationship with at least one optical network unit in the virtualized passive optical network identified by the VPON ID. According to the method provided by the embodiments of the present invention, on one hand, complex networking performed to deal with different application scenarios is avoided.

12 Claims, 19 Drawing Sheets

(56) References Cited

U.S. PATENT DOCUMENTS

| | | |
|---|---|---|
| 2009/0092394 A1 | 4/2009 | Wei et al. |
| 2009/0297152 A1 | 12/2009 | Bainbridge et al. |
| 2013/0004156 A1 | 1/2013 | Yang et al. |
| 2013/0045012 A1 | 2/2013 | Kanonakis et al. |
| 2013/0094861 A1* | 4/2013 | Luo .................... H04J 14/0278 398/68 |

FOREIGN PATENT DOCUMENTS

| | | |
|---|---|---|
| CN | 101247310 A | 8/2008 |
| EP | 2 015 520 A1 | 1/2009 |

\* cited by examiner

| PLI | VPON ID | GEM PORT | PTI | HEC | Fragments payload |

FIG. 6-a

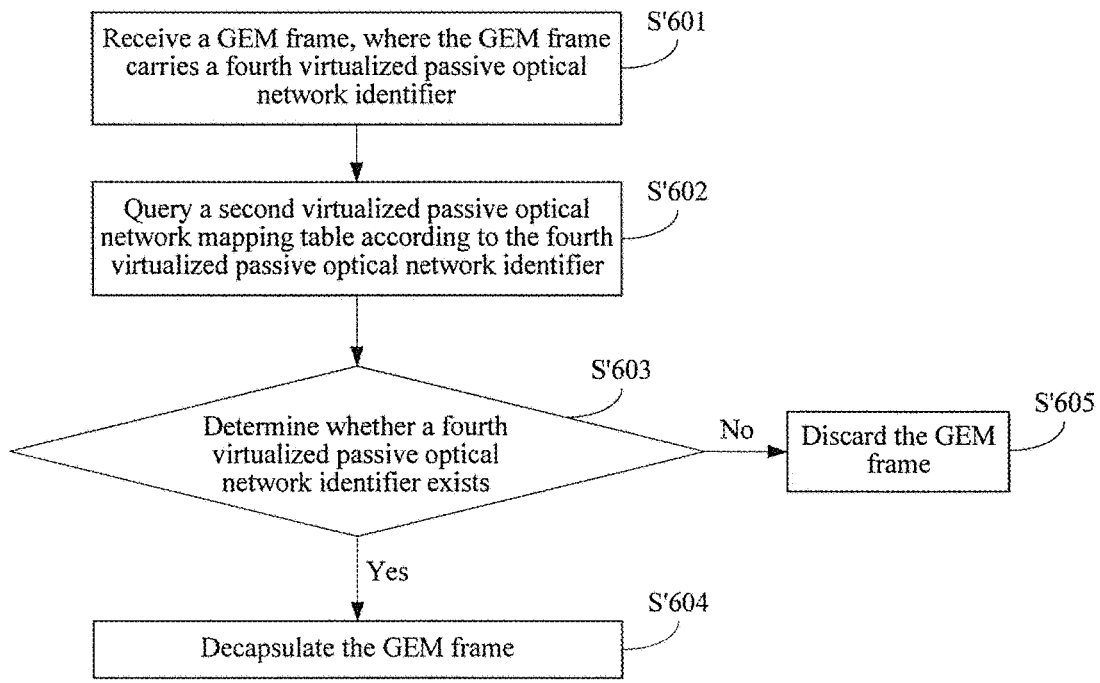
FIG. 6-b
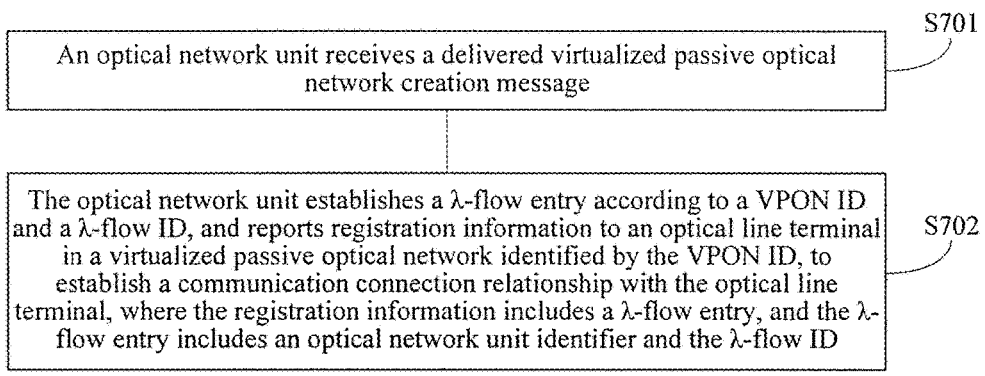
FIG. 7

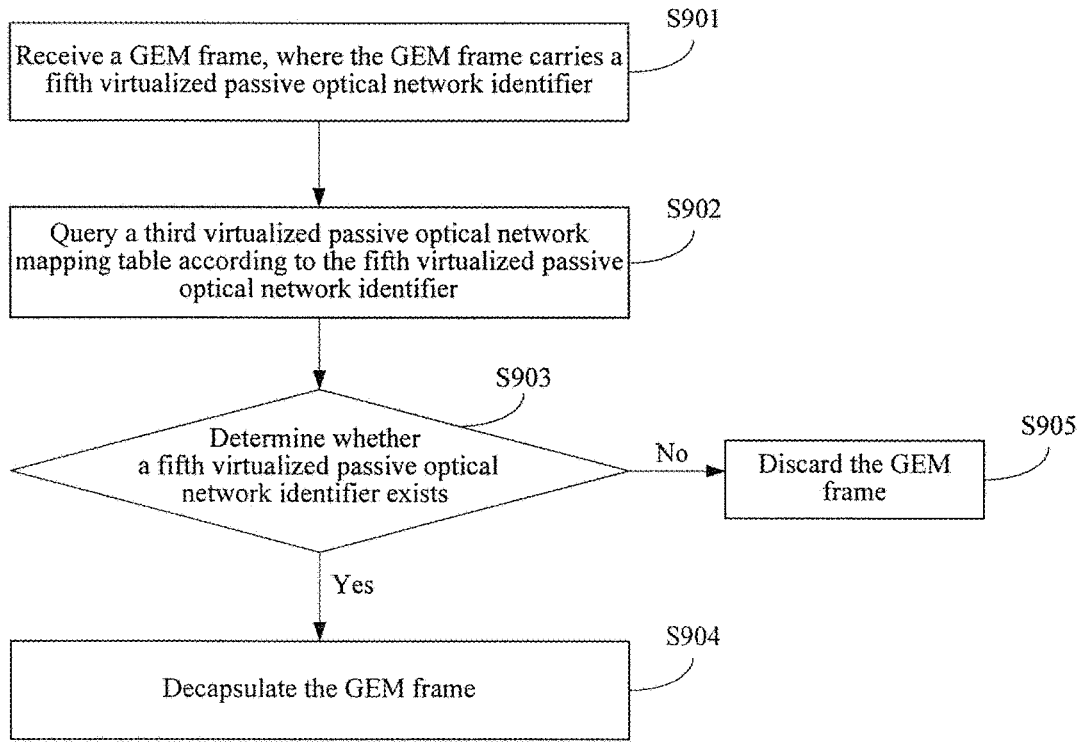
FIG. 9-a
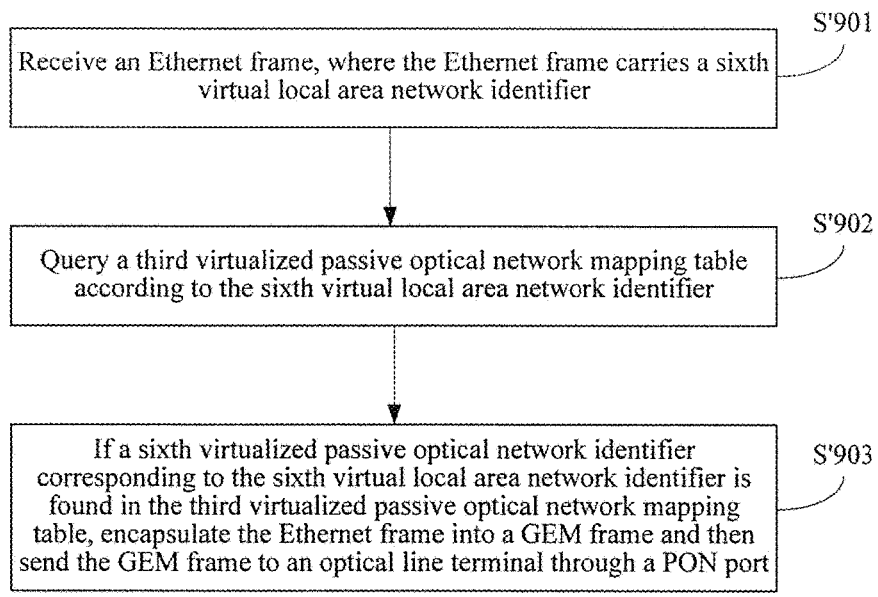
FIG. 9-b

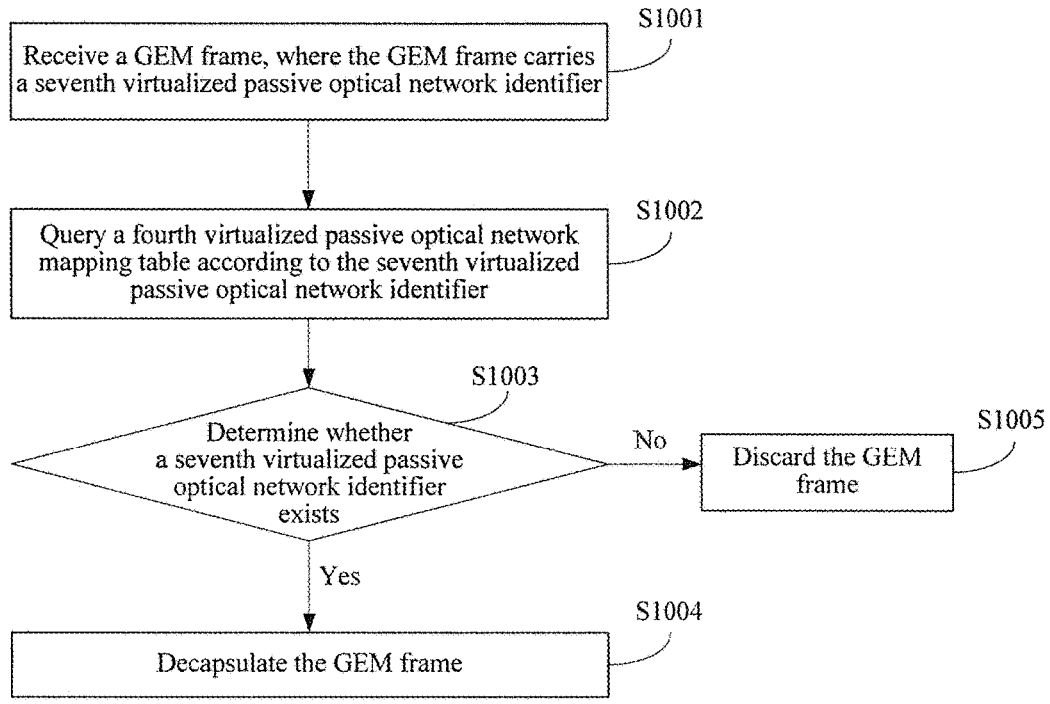
FIG. 10-a
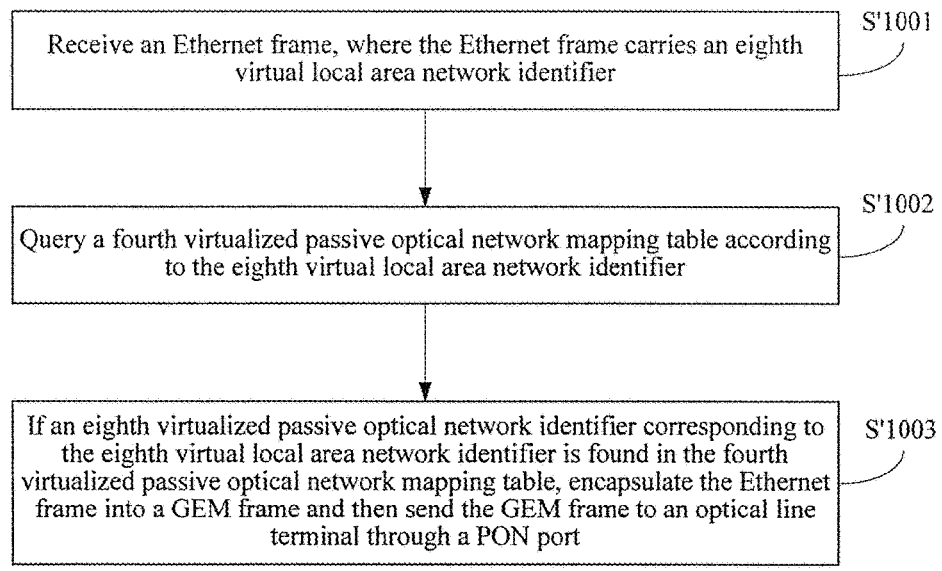
FIG. 10-b

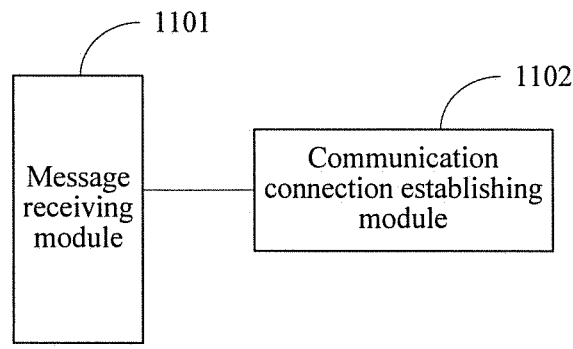
FIG. 11
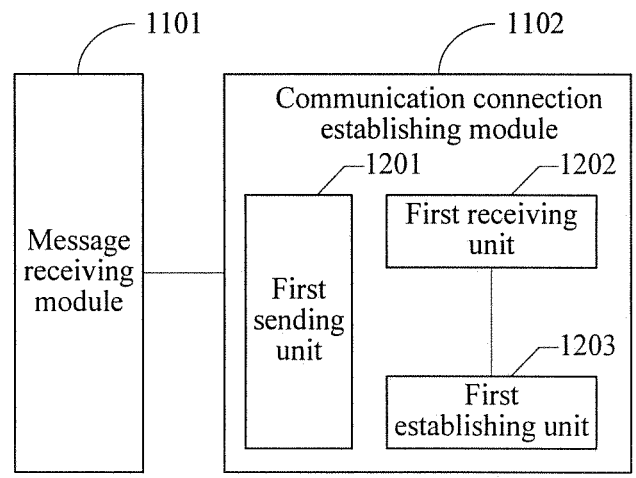
FIG. 12
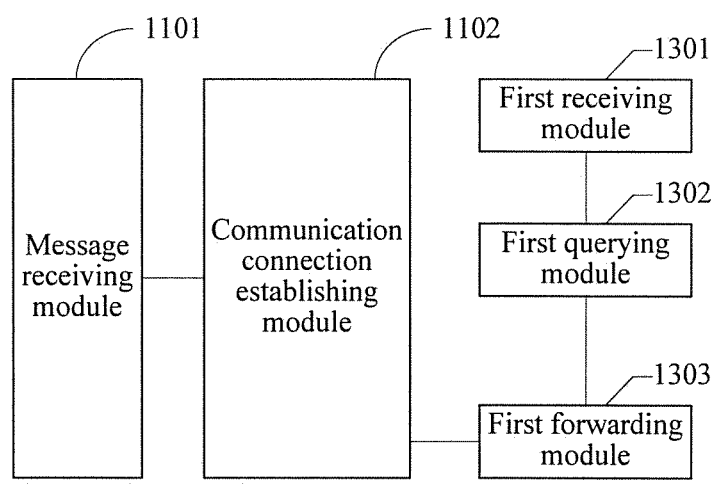
FIG. 13-a

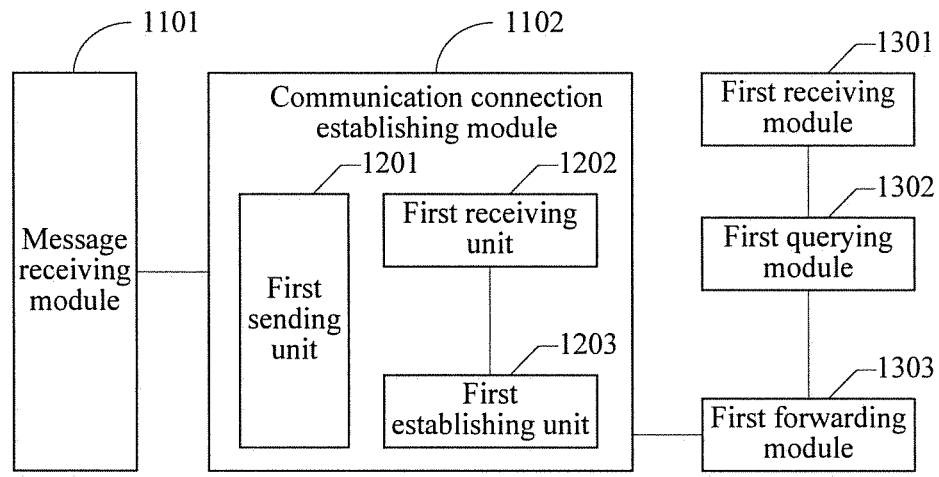
FIG. 13-b
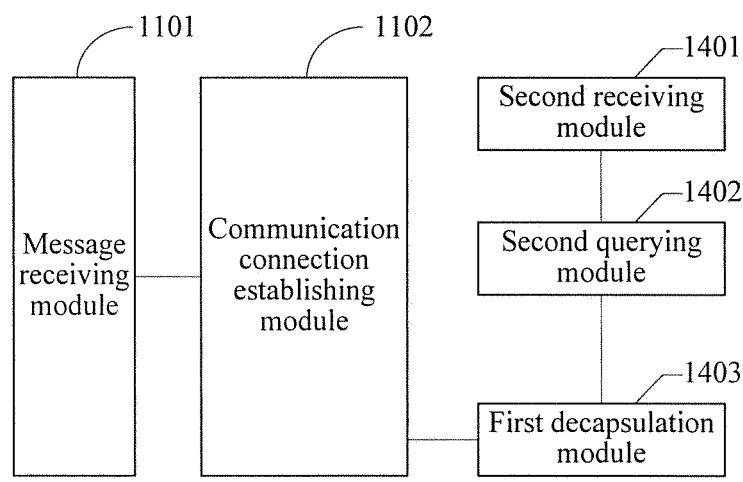
FIG. 14-a

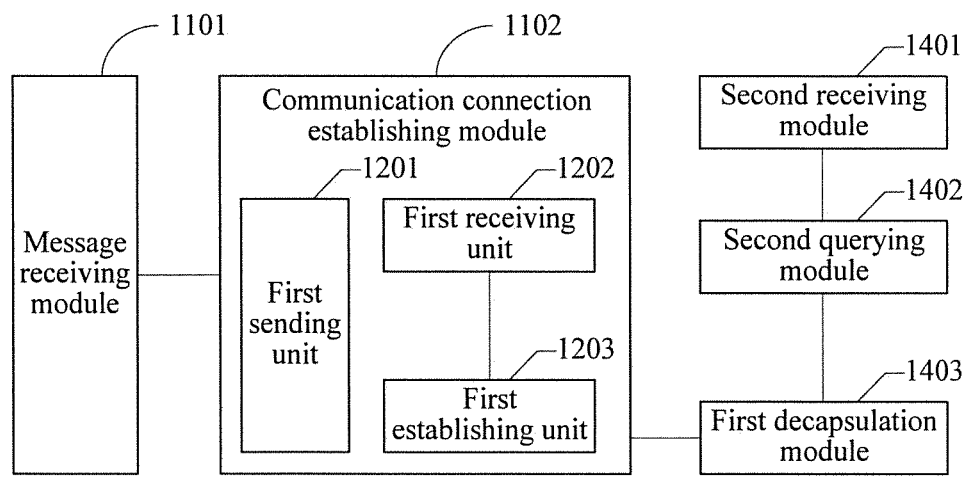
FIG. 14-b
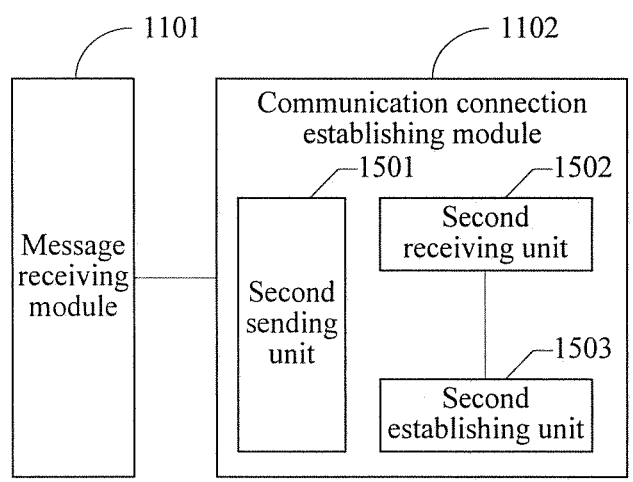
FIG. 15

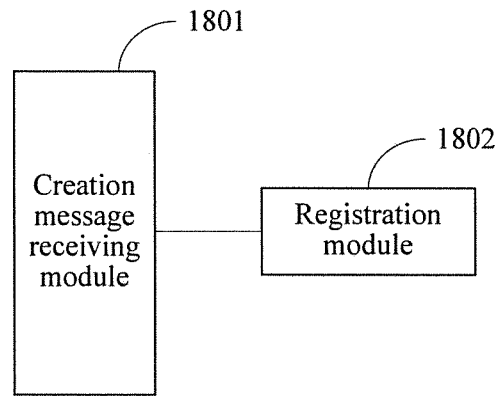
FIG. 18
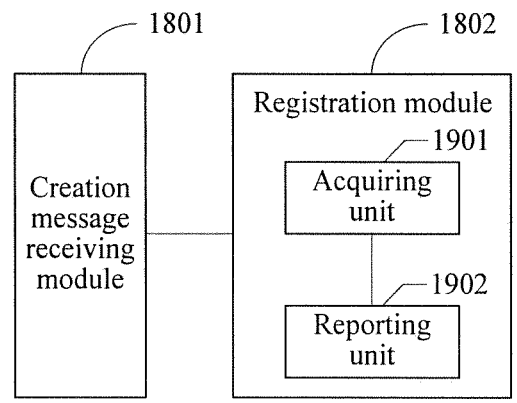
FIG. 19
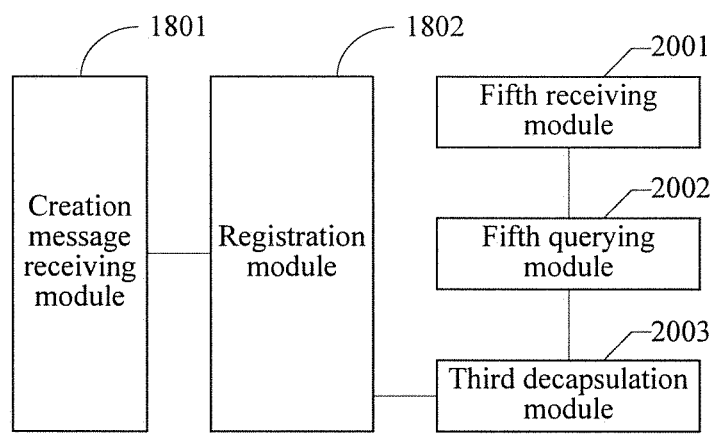
FIG. 20-a

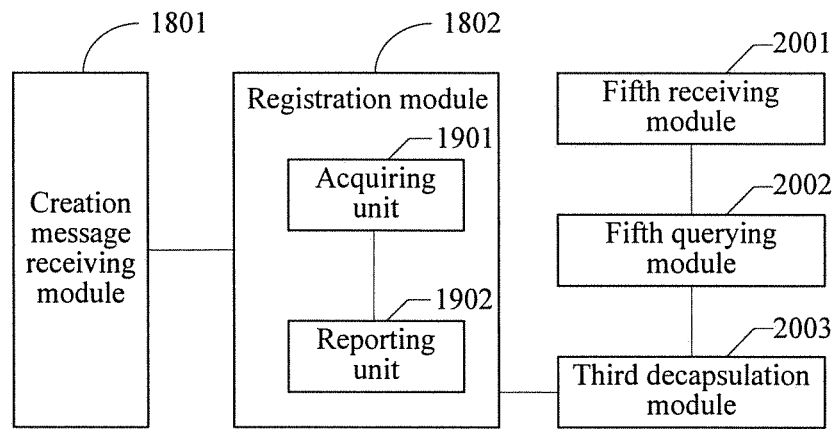
FIG. 20-b
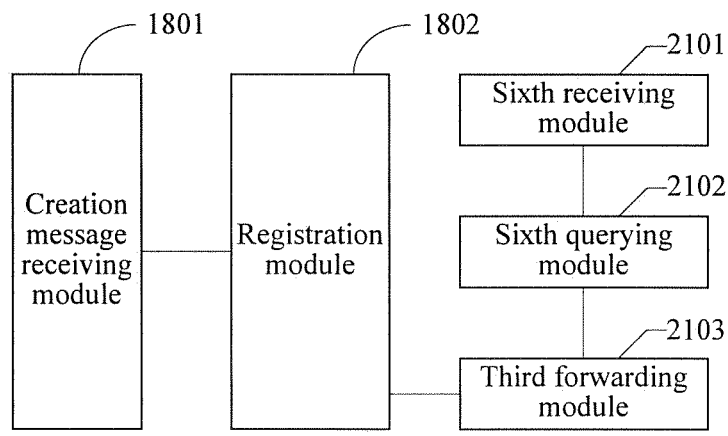
FIG. 21-a
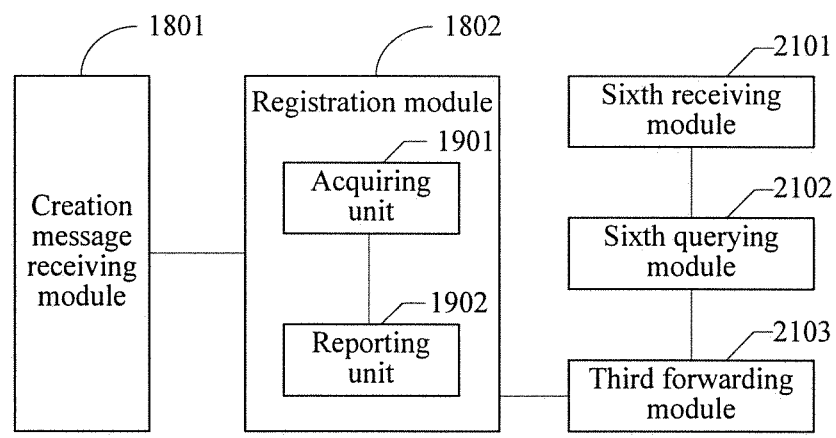
FIG. 21-b ially, an optical access technology characterized by point-to-multipoint transmission, that is, a passive optical network (passive optical network, PON) has gained the attention of the industry. Compared with point-to-point optical access, a PON central office uses a feeder fiber, which can be divided into tens of or even more fibers, to connect to users, and network construction costs are greatly reduced. The PON is a most economical and effective technical means of the FTTx. At present, a PON technology mainly includes an Ethernet passive optical network (Ethernet Passive Optical Network, EPON), a gigabit passive optical network (Gigabit Passive Optical Network, GPON), and the like, and a main difference between the EPON and the GPON lies in that different Layer 2 technologies are used.

With the arrival of an era of cloud computing, bandwidth and services of an access network increase rapidly, and problems and challenges that a conventional PON faces are increasingly prominent. The conventional PON is designed by using broadband access of residential users as the core, and a bandwidth statistical multiplexing gain brought by Time Division Multiple Access (TDMA) and a large port convergence ratio are core technical advantages of the conventional PON. However, when a TDMA channel is applied to a service scenario other than residential broadband access, there are many limitations and disadvantages. For example, for enterprise access, a current manner of sharing bandwidth in a time division multiplexing (Time-Division Multiplexing, TDM) manner causes security and reliability problems or the like to the enterprise access; for another example, a low delay of wireless backhaul, precise time synchronization, and large exclusive bandwidth is a key requirement, and therefore, a Time Division Multiple Access technology is not suitable to be used.

For the problems and challenges that the foregoing conventional PON network faces, a solution provided by the prior art is to use different systems separately for different application scenarios. For example, for residential users, a TDM-PON (for example, a GPON or an EPON) is used; for wireless backhaul, a WDM-PON with a low delay is used, or, two systems are stacked in a wavelength superposition manner, to deal with scenarios of residential users and wireless backhaul.
METHOD AND APPARATUS FOR VIRTUALIZING PASSIVE OPTICAL NETWORK, AND PASSIVE OPTICAL NETWORK VIRTUALIZATION SYSTEM

CROSS-REFERENCE TO RELATED APPLICATIONS

This application is a continuation of International Application No. PCT/CN2013/077058, filed on Jun. 9, 2013, which is hereby incorporated by reference in its entirety.

TECHNICAL FIELD

The present invention relates to the field of communications, and in particular, to a method and an apparatus for virtualizing a passive optical network, and a passive optical network virtualization system.

BACKGROUND

Currently, FTTx has become very popular in an access domain because of its advantages such as high bandwidth and a long distance, and particu However, in the foregoing solution provided by the prior art, no matter which manner is used, different systems are required to deal with different scenarios, which not only increases investment costs, but also causes complex operation and maintenance.

SUMMARY

Embodiments of the present invention provide a method and an apparatus for virtualizing a passive optical network, and a passive optical network virtualization system, so as to meet different requirements in different scenarios and also reduce the complexity of operation administration maintenance of a passive optical network system.

An embodiment of the present invention provides a method for virtualizing a passive optical network, where the method includes: receiving a virtualized passive optical network creation message, where the virtualized passive optical network creation message includes an identifier VPON ID of a to-be-created virtualized passive optical network and at least one wavelength flow identifier λ-flow ID, the VPON ID is used to identify the virtualized passive optical network formed by a virtualized optical line terminal and the at least one optical network unit, and the λ-flow ID is used to identify one wavelength flow; and establishing, according to the VPON ID and the at least one λ-flow ID, a communication connection relationship with the at least one optical network unit in the virtualized passive optical network identified by the VPON ID.

Another embodiment of the present invention provides a method for virtualizing a passive optical network, where the method includes: receiving, by an optical network unit, a delivered virtualized passive optical network creation message, where the virtualized passive optical network creation message includes an identifier VPON ID of a to-be-created virtualized passive optical network and at least one wavelength flow identifier λ-flow ID; and establishing, by the optical network unit, a λ-flow entry according to the VPON ID and the λ-flow ID, and reporting registration information to an optical line terminal in the virtualized passive optical network identified by the VPON ID, to establish a communication connection relationship with the optical line terminal, where the registration information includes a λ-flow entry, and the λ-flow entry includes an optical network unit identifier and the λ-flow ID.

An embodiment of the present invention provides an apparatus for virtualizing a passive optical network, where the apparatus includes: a message receiving module, configured to receive a virtualized passive optical network creation message, where the virtualized passive optical network creation message includes an identifier VPON ID of a to-be-created virtualized passive optical network and at least one wavelength flow identifier λ-flow ID, the VPON ID is used to identify the virtualized passive optical network formed by a virtualized optical line terminal and the at least one optical network unit, and the λ-flow ID is used to identify one wavelength flow; and a communication connection establishing module, configured to establish, according to the VPON ID and the at least one λ-flow ID, a communication connection relationship with the at least one optical network unit in the virtualized passive optical network identified by the VPON ID.

Another embodiment of the present invention provides an apparatus for virtualizing a passive optical network, where the apparatus includes: a creation message receiving module, configured to receive a delivered virtualized passive optical network creation message, where the virtualized passive optical network creation message includes an identifier VPON ID of a to-be-created virtualized passive optical network and at least one wavelength flow identifier λ-flow ID; and a registration module, configured to establish a λ-flow entry according to the VPON ID and the λ-flow ID, and report registration information to an optical line terminal in the virtualized passive optical network identified by the VPON ID, to establish a communication connection relationship with the optical line terminal, where the registration information includes a λ-flow entry, and the λ-flow entry includes an optical network unit identifier and the λ-flow ID.

An embodiment of the present invention provides a passive optical network virtualization system, where the system includes an upper management and control module, at least one optical line terminal, an arrayed waveguide grating, an optical splitter, and at least one optical network unit, where the arrayed waveguide grating is separately connected to the optical line terminal and the optical splitter by using an optical fiber, and the optical splitter is connected to the optical network unit by using an optical fiber;

the upper management and control module is configured to create a virtualized passive optical network, and send a virtualized passive optical network creation message to the optical line terminal, where the virtualized passive optical network creation message includes an identifier VPON ID of a to-be-created virtualized passive optical network and at least one wavelength flow identifier λ-flow ID, the VPON ID is used to identify the virtualized passive optical network formed by a virtualized optical line terminal and the at least one optical network unit, and the λ-flow ID is used to identify a wavelength flow used for bidirectional communication between the optical line terminal and the optical network unit;

the optical line terminal is configured to receive the virtualized passive optical network creation message sent by the upper management and control module, establish, according to the VPON ID and the at least one λ-flow ID, a communication connection relationship with the at least one optical network unit in the virtualized passive optical network identified by the VPON ID, and deliver the virtualized passive optical network creation message to the optical network unit;

the arrayed waveguide grating is configured to multiplex, in a downlink direction, the wavelength flow used for bidirectional communication between the optical line terminal and the optical network unit and then inject the multiplexed wavelength flow to the optical splitter, and demultiplex, in an uplink direction, the wavelength flow used for bidirectional communication between the optical line terminal and the optical network unit and then send the demultiplexed wavelength flow to the optical line terminal;

the optical splitter is configured to broadcast, in the downlink direction, the wavelength flow injected by the arrayed waveguide grating, and send, in the uplink direction, a wavelength flow tuned by the optical network unit to the arrayed waveguide grating; and the optical network unit is configured to receive the virtualized passive optical network creation message delivered by the optical line terminal, establish a λ-flow entry according to the VPON ID and the λ-flow ID, and report registration information to the optical line terminal in the virtualized passive optical network identified by the VPON ID, to establish a communication connection relationship with the optical line terminal, where the registration information includes a λ-flow entry, and the λ-flow entry includes an optical network unit identifier and the λ-flow ID.

Another embodiment of the present invention provides a passive optical network virtualization system, where the system includes an upper management and control module, at least two optical line terminals, at least two arrayed waveguide gratings, at least two optical splitters, at least two optical network units, and at least one cyclic arrayed waveguide grating, where the at least two optical line terminals include at least two optical modules, optical modules in the at least two optical modules are connected to arrayed waveguide gratings in the at least two arrayed waveguide gratings by using an optical fiber, the cyclic arrayed waveguide grating is separately connected to the arrayed waveguide grating and the optical splitter by using an optical fiber, and the at least two optical splitters are respectively connected to the at least two optical network units by using an optical fiber;

the upper management and control module is configured to create a virtualized passive optical network, and send a virtualized passive optical network creation message to the optical line terminal, where the virtualized passive optical network creation message includes an identifier VPON ID of a to-be-created virtualized passive optical network, a wavelength flow identifier λ-flow ID, an optical module identifier M ID, and an optical distribution network identifier ODN ID, the VPON ID is used to identify the virtualized passive optical network formed by a virtualized optical line terminal and the at least one optical network unit, the λ-flow ID is used to identify a wavelength flow used for bidirectional communication between the optical line terminal and the optical network unit, the M ID is used to identify an optical module to which a wavelength flow identified by the λ-flow ID belongs, and the ODN ID is used to identify an optical distribution network to which the wavelength flow identified by the λ-flow ID belongs;

the optical line terminal is configured to receive the virtualized passive optical network creation message sent by the upper management and control module, establish, according to the VPON ID, the λ-flow ID, the M ID, and the ODN ID, a communication connection relationship with the at least one optical network unit in the virtualized passive optical network identified by the VPON ID, the M ID, and the ODN ID, and deliver the virtualized passive optical network creation message to the optical network unit;

the arrayed waveguide grating is configured to multiplex, in a downlink direction, the wavelength flow used for bidirectional communication between the optical line terminal and the optical network unit and then inject the multiplexed wavelength flow to the cyclic arrayed waveguide grating, and demultiplex, in an uplink direction, the wavelength flow from the cyclic arrayed waveguide grating and then send the demultiplexed wavelength flow to the optical line terminal;

the cyclic arrayed waveguide grating is configured to separately allocate, in the downlink direction, wavelength flows from the at least two arrayed waveguide gratings to the at least two optical splitters, and separately allocate, to the at least two optical modules in the uplink direction, the wavelength flow used for bidirectional communication between the optical line terminal and the optical network unit;

the optical splitter is configured to broadcast, in the downlink direction, the wavelength flow injected by the arrayed waveguide grating, and send, in the uplink direction, a wavelength flow tuned by the optical network unit to the arrayed waveguide grating; and the optical network unit is configured to receive the virtualized passive optical network creation message delivered by the optical line terminal, establish a λ-flow entry according to the VPON ID, the λ-flow ID, the M ID, and the ODN ID, and report registration information to the optical line terminal in the virtualized passive optical network identified by the VPON ID, the M ID, and the ODN ID, to establish a communication connection relationship with the optical line terminal, where the registration information includes a λ-flow entry, and the λ-flow entry includes an optical network unit identifier, the λ-flow ID, the M ID, and the ODN ID.

It can be known from the foregoing embodiments of the present invention that, a VPON ID included in a virtualized passive optical network creation message identifies a virtualized passive optical network formed by a virtualized optical line terminal and at least one optical network unit, and a communication connection relationship can be established, according to the VPON ID and at least one wavelength flow identifier, with the at least one optical network unit in the virtualized passive optical network identified by the VPON ID. Because a passive optical network and an optical line terminal therein are virtualized, a connection between an optical network unit and the optical line terminal is no longer limited to an actual physical connection, and flexible networking can be performed according to a user requirement. Therefore, according to the method provided by the embodiments of the present invention, on one hand, an increase in investment costs and complex operation administration maintenance caused by performing complex networking to deal with different application scenarios are avoided; on the other hand, a virtualized passive optical network identified by each VPON ID is created based on λ-flows of different attributes identified by λ-flow IDs, and an operation mode, a transmission rate and the like that correspond to each λ-flow may be software-defined. Therefore, a created VPON can fully meet various scenarios such as access of residential users, access of enterprise users, and wireless backhaul, and can resolve various problems brought by dealing with full-service access by using a single time-division channel.

BRIEF DESCRIPTION OF THE DRAWINGS

To describe the technical solutions in the embodiments of the present invention more clearly, the following briefly introduces the accompanying drawings required for describing the prior art or the embodiments. Apparently, the accompanying drawings in the following description show some embodiments of the present invention, and a person of ordinary skill in the art may still derive other drawings from these accompanying drawings.

FIG. 4-b is a schematic flowchart of a method for forwarding, by an OLT, an uplink service flow in a virtualized passive optical network according to an embodiment of the present invention;

FIG. 6-b is a schematic flowchart of a method for forwarding, by an OLT, an uplink service flow in a virtualized passive optical network according to another embodiment of the present invention;

FIG. 7 is a schematic flowchart of a method for virtualizing a passive optical network according to another embodiment of the present invention;

FIG. 9-a is a schematic flowchart of a method for forwarding, by an ONU, a downlink service flow in a virtualized passive optical network according to an embodiment of the present invention;

FIG. 9-b is a schematic flowchart of a method for forwarding, by an ONU, an uplink service flow in a virtualized passive optical network according to an embodiment of the present invention;

FIG. 10-a is a schematic flowchart of a method for forwarding, by an ONU, a downlink service flow in a virtualized passive optical network according to another embodiment of the present invention;

FIG. 10-b is a schematic flowchart of a method for forwarding, by an ONU, an uplink service flow in a virtualized passive optical network according to another embodiment of the present invention;

FIG. 11 is a schematic structural diagram of an apparatus for virtualizing a passive optical network according to an embodiment of the present invention;

FIG. 12 is a schematic structural diagram of an apparatus for virtualizing a passive optical network according to another embodiment of the present invention;

FIG. 13-a is a schematic structural diagram of an apparatus for virtualizing a passive optical network according to another embodiment of the present invention;

FIG. 13-b is a schematic structural diagram of an apparatus for virtualizing a passive optical network according to another embodiment of the present invention;

FIG. 14-a is a schematic structural diagram of an apparatus for virtualizing a passive optical network according to another embodiment of the present invention;

FIG. 14-b is a schematic structural diagram of an apparatus for virtualizing a passive optical network according to another embodiment of the present invention;

FIG. 15 is a schematic structural diagram of an apparatus for virtualizing a passive optical network according to another embodiment of the present invention;

FIG. 18 is a schematic structural diagram of an apparatus for virtualizing a passive optical network according to another embodiment of the present invention;

FIG. 19 is a schematic structural diagram of an apparatus for virtualizing a passive optical network according to another embodiment of the present invention;

FIG. 20-a is a schematic structural diagram of an apparatus for virtualizing a passive optical network according to another embodiment of the present invention;

FIG. 20-b is a schematic structural diagram of an apparatus for virtualizing a passive optical network according to another embodiment of the present invention;

FIG. 21-a is a schematic structural diagram of an apparatus for virtualizing a passive optical network according to another embodiment of the present invention;

FIG. 21-b is a schematic structural diagram of an apparatus for virtualizing a passive optical network according to another embodiment of the present invention;

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention shall fall within the protection scope of the present invention.

Figure 1:
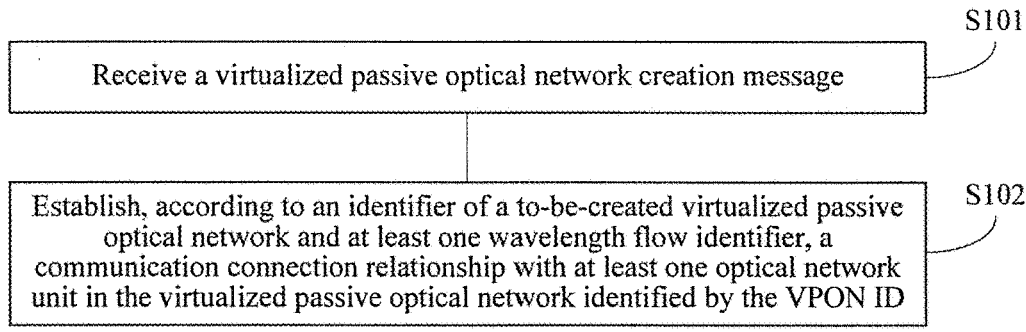
FIG. 1 is a schematic flowchart of a method for virtualizing a passive optical network according to an embodiment of the present invention.

Refer to FIG. 1, which is a schematic flowchart of a method for virtualizing a passive optical network according to an embodiment of the present invention. The method shown in FIG. 1 mainly includes step S101 and step S102, which are described in detail as follows:

S101. Receive a virtualized passive optical network creation message.

Figure 2:
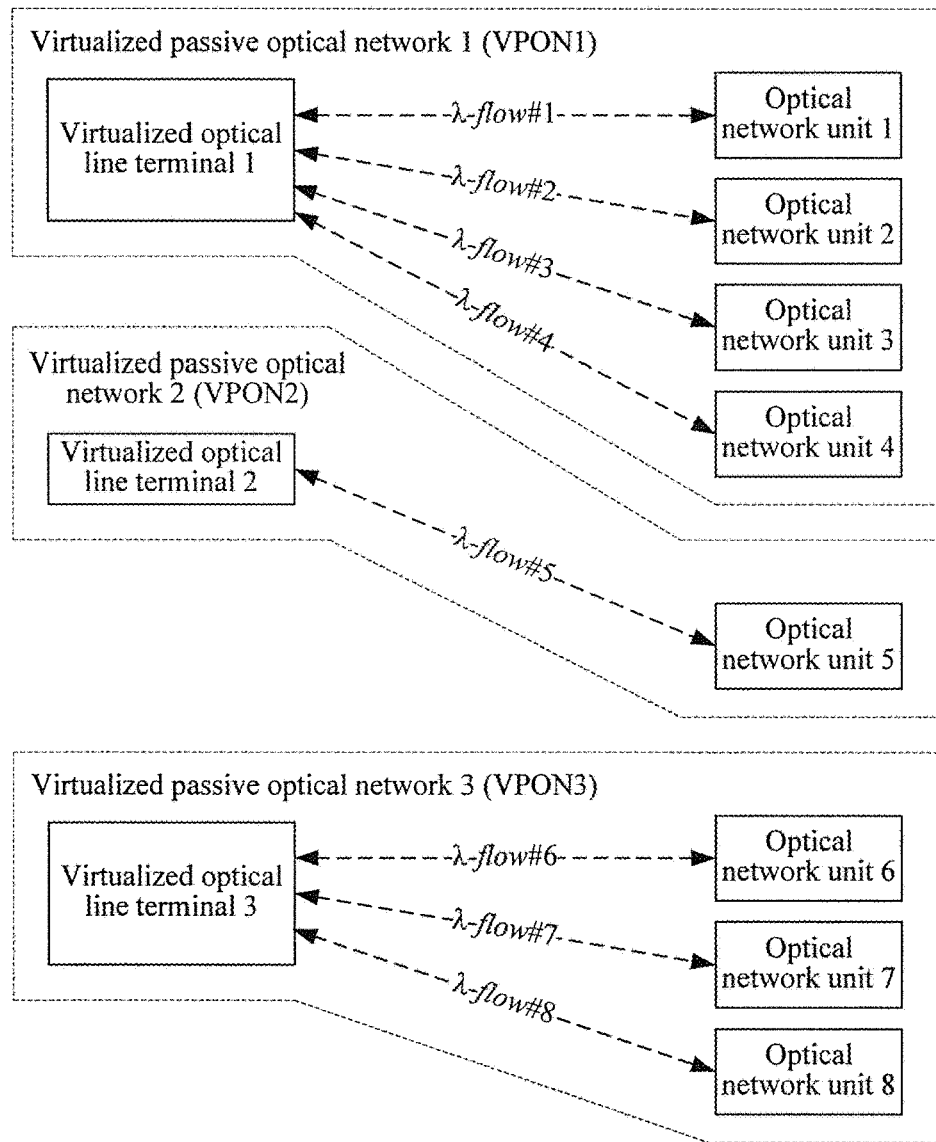
FIG. 2 is a schematic diagram of a virtualized passive optical network according to an embodiment of the present invention.

In this embodiment of the present invention, the virtualized passive optical network creation message is from an upper management and control module. The upper management and control module, such as a virtualized passive optical network controller (VPON Controller), may deliver a virtualized passive optical network creation message through a network standard control interface, such as an openflow interface in a software defined network (Software Defined Network, SDN), where the virtualized passive optical network creation message includes an identifier (Virtualized Passive Optical Network IDentifier, VPON ID) of a to-be-created virtualized passive optical network and at least one wavelength flow identifier λ-flow ID, where the VPON ID is used to identify the virtualized passive optical network formed by a virtualized optical line terminal and at least one optical network unit, the λ-flow ID is used to identify one wavelength flow (λ-flow), that is, identify a wavelength flow used for bidirectional communication between a virtualized OLT and a physical ONU, and each wavelength flow has an attribute of the wavelength flow. The virtualized (Virtualized) optical line terminal (Optical Line Terminal) is mainly embodied in that its processing capability is formed by allocating, by using a virtualization technology, a part of processing capability in an optical line terminal pool (Pool), that is, if a new OLT pool is created in a central office, processing on a signal sent or received by each ONU can be completed in a virtualized OLT in the OLT pool; a VPON architecture formed by a virtualized OLT and a physical ONU breaks a fixed connection relationship that must exists between an OLT and an ONU in an existing PON in a same ODN, that is, in the VPON architecture, each ONU does not belong to any OLT. An optical line terminal, in one VPON, "connected" to an optical network unit is not a physical optical line terminal, but is a virtualized OLT corresponding to a VPON identified by the VPON ID, where the "connection" is a connection identified based on the λ-flow ID and the VPON ID, and is not a physical connection, but is a logical connection or a connection similar to a logical connection. For example, as shown in FIG. 2, in a virtualized passive optical network identified by a VPON ID1, because there is only one virtualized optical line terminal (Virtualized OLT), the VPON ID1 also identifies the virtualized optical line terminal. When the virtualized optical line terminal identified by the VPON ID1 is connected to multiple physical optical network units (4 optical network units are shown in the figure, which are separately represented by ONU#1, ONU#2, ONU#3, and ONU#4), a wavelength flow identifier 1 (λ-flow#1), a wavelength flow identifier 2 (λ-flow#2), a wavelength flow identifier 3 (λ-flow#3), a wavelength flow identifier 4 (λ-flow#4), and the VPON ID1 may be used for representation. For example, the VPON ID1 and the λ-flow#1 represent a connection relationship between ONU#1 and a virtualized optical line terminal. In addition to including the foregoing VPON ID and λ-flow ID, the virtualized passive optical network creation message may further include information such as a communications protocol and a transceiver (a sending/receiving unit in a physical optical line terminal) identifier.

S102. Establish, according to an identifier of a to-be-created virtualized passive optical network and at least one wavelength flow identifier, a communication connection relationship with at least one optical network unit in the virtualized passive optical network identified by the VPON ID.

In this embodiment of the present invention, the establishing, according to an identifier of a to-be-created virtualized passive optical network and at least one wavelength flow identifier, a communication connection relationship with at least one optical network unit in the virtualized passive optical network identified by the VPON ID is completed by an optical line terminal with an optical network unit through negotiation, that is, the optical line terminal delivers, to the optical network unit, the virtualized passive optical network creation message received from the upper management and control module, and the optical network unit returns necessary information according to its own status, and then, the optical line terminal establishes a registration mapping table. Specifically, as an embodiment of the present invention, the establishing, according to an identifier of a to-be-created virtualized passive optical network and at least one wavelength flow identifier, a communication connection relationship with at least one optical network unit in the virtualized passive optical network identified by the VPON ID may include: sending, by the optical line terminal, the virtualized passive optical network creation message to the at least one optical network unit, then, receiving registration information that is registered in the optical line terminal and returned by the at least one optical network unit, where the registration information includes a wavelength flow λ-flow entry, and finally, establishing, by the optical line terminal, a first registration mapping table according to the VPON ID and the λ-flow entry, where each entry of the first registration mapping table includes the VPON ID and at least one λ-flow entry, and the interactions between the optical line terminal and the optical network unit may be implemented by transmitting an operation administration maintenance (Operation Administration Maintenance, OAM) message. For example, a GPON system implements the interactions by transmitting a physical layer operation administration maintenance (Physical Layer Operation Administration Maintenance, PLOAM) message, an EPON and P2P system implements the interactions by transmitting an Ethernet OAM message, and the like. In this embodiment of the present invention, one λ-flow entry is used to describe an attribute of one corresponding wavelength flow, and mainly includes fields such as a wavelength flow identifier (λ-flow ID), a protocol type (Protocol), a link loss (Link loss), a transceiver identifier (TRx ID), a downlink wavelength (DS_wavelength), an uplink wavelength (US_wavelength), a downlink maximum transmission rate (DS_MTR), an optical network unit identifier (ONU ID), and an uplink maximum transmission rate (US_MTR) shown in the following Table 1, and may further include an optical network unit sequence number (ONU SN), which is not shown in Table 1 one by one.

sion rate supported by an OLT and an ONU at a corresponding link loss in an uplink direction. The DS_MTR and US_MTR may be adaptive to a link loss (Link loss), that is, a maximum link transmission rate at a low link loss is high, a maximum link transmission rate at a high link loss is low, and an actual maximum link transmission rate may be software-defined. For example, in a λ-flow entry shown in Table 1, for wavelength flows whose protocol types are both a GPON and λ-flow IDs are separately 0002 and 0003, in a case in which the link loss is 24 dB, DS_MTR and US_MTR are respectively 2500 Mbps and 1250 Mbps, and in a case in which the link loss is 32 dB, DS_MTR and US_MTR are respectively 622 Mbps and 155 Mbps. Certainly, the λ-flow entry may further include information such as an optical distribution network sequence number (ODN SN), which is not directly related to this embodiment, and is not shown in Table 1 one by one.

The registration mapping table (which is referred to as "a first registration mapping table" herein to distinguish from other registration mapping tables in the following description) established by the optical line terminal according to the VPON ID and the λ-flow entry actually is a superposition of

TABLE 1

| λ-flow ID | Protocol | Link loss (dB) | TRx ID | DS_wavelength (nm) | US_wavelength (nm) | DS_MTR (Mbps) | US_MTR (Mbps) | ONU ID |
|---|---|---|---|---|---|---|---|---|
| 0001 | EPON | 23 | 001 | 1554.13 | 1535.04 | 1250 | 1250 | 101 |
| 0002 | GPON | 24 | 002 | 1555.75 | 1536.61 | 2500 | 1250 | 111 |
| 0003 | GPON | 32 | 002 | 1555.75 | 1536.61 | 622 | 155 | 112 |
| 0004 | P2P GE | 35 | 003 | 1557.36 | 1538.19 | 1000 | 1000 | 121 |
| 0005 | P2P 10GE | 38 | 004 | 1553.98 | 1539.77 | 10000 | 10000 | 201 |

In the foregoing Table 1, Link loss refers to a link loss between an OLT and an ONU, and DS_MTR and US_MTR respectively refer to a maximum link transmission rate supported by an OLT and an ONU at a corresponding link loss in a downlink direction and a maximum link transmission rate.

the λ-flow entry and the VPON ID, as shown in the following Table 2:

TABLE 2

| VPON ID | λ-flow ID | Protocol | Link loss (dB) | TRx ID | DS_wavelength (nm) | US_wavelength (nm) | DS_MTR (Mbps) | US_MTR (Mbps) | ONU ID |
|---|---|---|---|---|---|---|---|---|---|
| 100 | 0001 | EPON | 23 | 001 | 1554.13 | 1535.04 | 1250 | 1250 | 101 |
|  | 0002 | GPON | 24 | 002 | 1555.75 | 1536.61 | 2500 | 1250 | 111 |
| 200 | 0003 | GPON | 32 | 002 | 1555.75 | 1536.61 | 622 | 155 | 112 |
|  | 0004 | P2P GE | 35 | 003 | 1557.36 | 1538.19 | 1000 | 1000 | 121 |
| 300 | 0005 | P2P 10GE | 38 | 004 | 1553.98 | 1539.77 | 10000 | 10000 | 201 |

Figure 3:
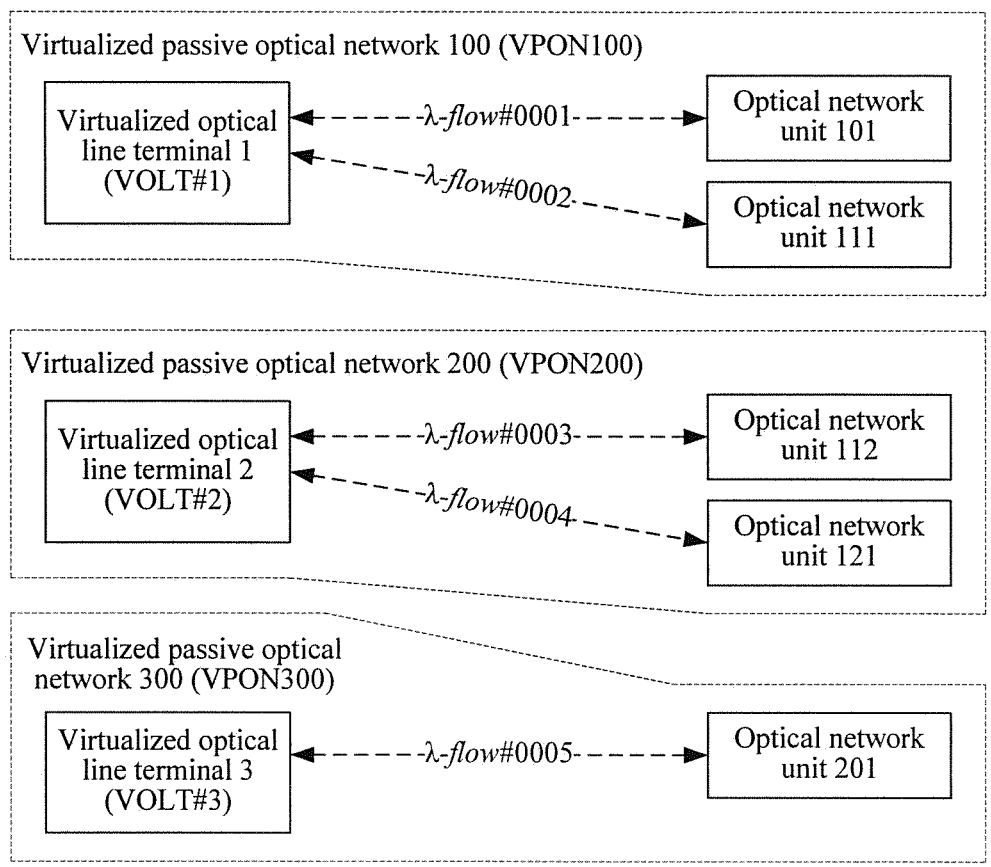
FIG. 3 is a schematic diagram of a virtualized passive optical network according to another embodiment of the present invention.

Establishment of the first registration mapping table shown in Table 2 also represents establishment of a virtualized passive optical network, that is, which optical network units form the part of the virtualized passive optical network, the wavelength flow identifier, the corresponding wavelength flow and the like can be known from Table 2. For example, it can be known from the first registration mapping table shown in Table 2, ONUs identified by 101 and 111 create, respectively based on wavelength flows identified by 0001 and 0002 (which are respectively represented by λ-flow #0001 and λ-flow #0002), a VPON identified by 100, that is, the ONUs identified by 101 and 111 belong to one virtualized OLT (which is represented by VOLT#1); ONUs identified by 112 and 121 create, respectively based on wavelength flows identified by 0003 and 0004 (which are respectively represented by λ-flow #0003 and λ-flow #0004), a VPON identified by 200, that is, the ONUs identified by 112 and 121 belong to one virtualized OLT (which is represented by VOLT#2); and an ONU identified by 201 creates, based on a wavelength flow identified by 0005 (which is represented by λ-flow #0005), a VPON identified by 300, that is, the ONU identified by 201 belongs to one virtualized OLT (which is represented by VOLT#3). A virtualized passive optical network corresponding to Table 2 is shown in FIG. 3. It is noted that physical ONUs identified by 101 and 111 correspond to two transceivers whose transceiver identifiers (TRx IDs) are 001 and 002, that is, two physical optical line terminals are physically connected, and correspond to a VPON identified by 100, that is, a virtualized OLT (VOLT#1). Such a correspondence can also describe the method for virtualizing a passive optical network provided by this embodiment of present invention. A connection relationship between a physical OLT and an ONU in the VPON is not limited by an actual physical connection, and on the other hand, according to user requirements, the corresponding VPON or the ONU in the VPON may use different protocols, that is, may be set to different operation modes. Using Table 2 as an example, assuming that the ONUs identified by 111 and 112 access residential users, because bandwidth requirements of the ONUs are relatively low, the ONUs may use a GPON protocol, that is, may be set to a GPON operation mode; further assuming that the ONU identified by 201 is specific to a wireless backhaul scenario, because the ONU requires a small delay jitter and a large bandwidth requirement, the ONU may use a P2P 10GE protocol, that is, may be set to a P2P 10GE operation mode; further assuming that the ONU identified by 121 is specific to an enterprise access scenario, because security, reliability and stability are most important considerations, and it is undesired to share bandwidth with residential users in a time division multiplexing (Time-Division Multiplexing, TDM) manner, the ONU may use a P2P GE protocol, that is, may be set to a P2P GE operation mode. Because the corresponding VPON or the ONU in the VPON may use different protocols, that is, may be set to different operation modes, the method for virtualizing a passive optical network provided by this embodiment of the present invention can meet different user requirements in different application scenarios.

In another embodiment of the present invention, in addition to the identifier VPON ID of the to-be-created virtualized passive optical network and the at least one wavelength flow identifier λ-flow ID, the virtualized passive optical network creation message may further include an optical module identifier M ID and an optical distribution network identifier ODN ID, where the M ID is used to identify an optical module to which a wavelength flow identified by the λ-flow ID belongs, and the ODN ID is used to identify an optical distribution network to which the wavelength flow identified by the λ-flow ID belongs. Correspondingly, as another embodiment of the present invention, the establishing, according to an identifier of a to-be-created virtualized passive optical network and at least one wavelength flow identifier, a communication connection relationship with at least one optical network unit in the virtualized passive optical network identified by the VPON ID may include: sending, by an optical line terminal, to the at least one optical network unit, the virtualized passive optical network creation message that carries the M ID, the VPON ID, and the λ-flow ID; receiving registration information that is registered in the virtualized optical line terminal and returned by the at least one optical network unit, where the registration information includes a wavelength flow λ-flow entry; and establishing a second registration mapping table according to the VPON ID and the λ-flow entry, where each entry of the second registration mapping table includes the VPON ID and at least one λ-flow entry. Similar to the first registration mapping table in the foregoing embodiment, the second registration mapping table in this embodiment is also a superposition of the VPON ID and the at least one λ-flow entry, and the difference lies in that in this embodiment, the λ-flow entry includes the ODN ID and the M ID. Similar to the forgoing embodiment, in this embodiment, the interactions between the optical line terminal and the optical network unit may also be implemented by transmitting an OAM message, for example, a GPON system implements the interactions by transmitting a PLOAM message, an EPON and P2P system implements the interactions by transmitting an Ethernet OAM message, and the like.

It can be known from the foregoing method shown in FIG. 1 and the virtualized passive optical networks shown in FIG. 2 and FIG. 3, because the passive optical network created by the ONU and the physical OLT is virtualized, in a network topology created by the ONU and the physical OLT, the ONU is no longer only fixedly connected to one physical OLT. Therefore, bandwidth and hardware resources of PON ports are no longer independent of each other, and scheduling across PON ports can be performed, thereby implementing resource sharing between the PON ports.

An ultimate objective of establishing, by an OLT, a communication connection relationship with an optical network unit in a virtualized passive optical network is that an uplink service flow and a downlink service flow can be forwarded. Corresponding to the embodiment in which the virtualized passive optical network creation message includes the VPON ID and the at least one λ-flow ID, after the establishing, according to the VPON ID and the at least one λ-flow ID, a communication connection relationship with the at least one optical network unit in the virtualized passive optical network identified by the VPON ID, a method for forwarding, by an OLT, a downlink service flow shown in FIG. 4-*a* and a method for forwarding, by an OLT, an uplink service flow shown in FIG. 4-*b* are further included. The method for forwarding, by an OLT, a downlink service flow shown in FIG. 4-*a* is first described and includes:

S401. Receive an Ethernet frame, for example, receive an Ethernet frame that enters a virtualized MAC module from an Ethernet port, where the Ethernet frame carries a first virtual local area network identifier.

For ease of description, the first virtual local area network identifier is represented by a VLAN ID1 in the following description.

S402. Query a first virtualized passive optical network mapping table according to the first virtual local area network identifier.

In this embodiment of the present invention, an entry of the first virtualized passive optical network mapping table includes a virtual local area network identifier (Virtual Local Area Network Identifier, VLAN ID), and a VPON ID and a transceiver identifier (TRx ID) that correspond to the VLAN ID. The first virtualized passive optical network mapping table provided by this embodiment of the present invention is shown in the following Table 3:

TABLE 3

| ETH PORT | VLAN ID | VPON ID | TRx ID | GEM PORT |
| --- | --- | --- | --- | --- |
| 1 | 100 | 100 | 001 | 1001 |
| 2 | 101 | 100 | 002 | 1002 |
| 1 | 101 | 200 | 002 | 1003 |
| 2 | 102 | 200 | 003 | 1004 |
| 1 | 103 | 300 | 004 | 1005 |

The first virtualized passive optical network mapping table shown in Table 3 includes items such as an Ethernet port (ETH PORT), a virtual local area network identifier (VLAN ID), a virtualized passive optical network identifier (VPON ID), a transceiver identifier (TRx ID), and a GPON encapsulation method (GPON Encapsulation Method, GEM) port (PORT), and the first virtualized passive optical network mapping table may be configured manually or may be configured automatically.

S403. Determine whether a first virtualized passive optical network identifier corresponding to the first virtual local area network identifier exists.

That is, the first virtualized passive optical network mapping table shown in Table 3 is queried for whether a VPON ID1 corresponding to the first virtual local area network identifier (the first virtual local area network identifier is represented by the VLAN ID1 in the following description) exists, and if yes, the procedure goes to S404; otherwise, the procedure goes to S405. Actually, in the first virtualized passive optical network mapping table shown in Table 3, a VLAN ID also corresponds to a TRx ID, and therefore, the first virtualized passive optical network mapping table shown in Table 3 may also be queried for whether the VPON ID1 and a first transceiver identifier (the first transceiver identifier is represented by a TRx ID1 in the following description) that correspond to the VLAN ID1 exist, and if yes, the procedure goes to S404.

S404. Encapsulate the Ethernet frame into a GEM frame and then send the GEM frame to an optical network unit through a PON port corresponding to a first transceiver identifier, where a frame header of the GEM frame includes the VPON ID1.

Figure 5:
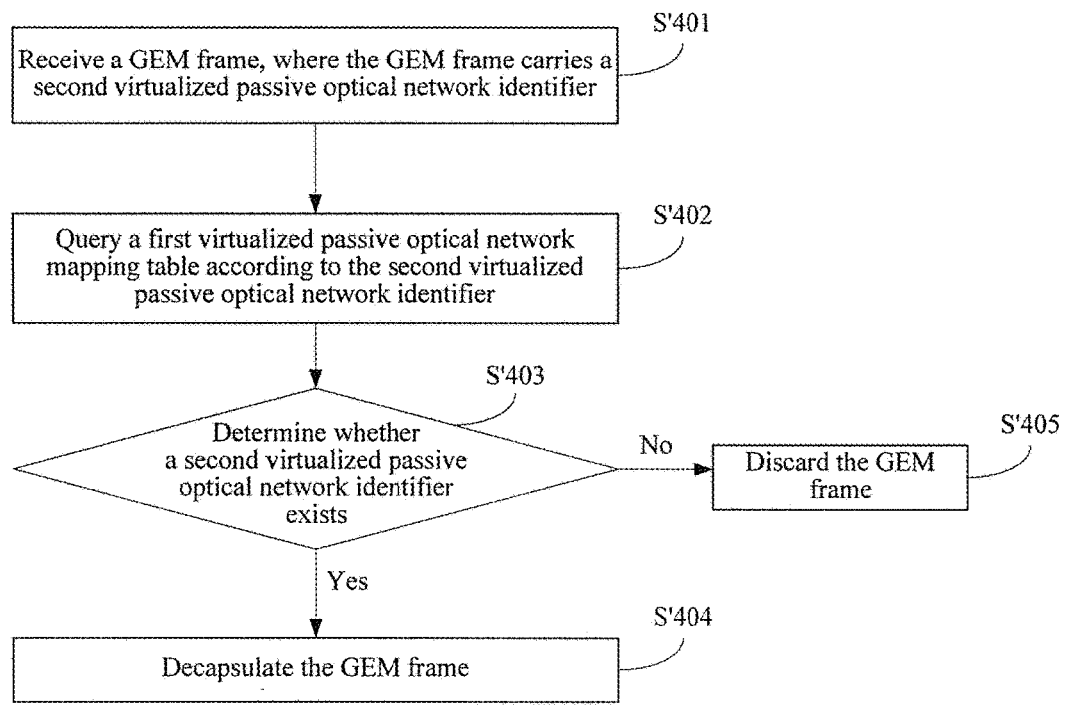
FIG. 5 is a schematic structural diagram of a GEM frame to which a VPON ID field is added according to an embodiment of the present invention.

That is, if the VPON ID1 corresponding to the VLAN ID1 is found, or, if the VPON ID1 and the TRx ID1 that correspond to the VLAN ID1 are found, the Ethernet frame is encapsulated into a GEM frame and then the GEM frame is sent to an optical network unit through a corresponding PON port, and this process is also a process of encapsulating an original Ethernet frame into a GEM frame according to a GEM PORT shown in Table 3. In this embodiment of the present invention, when the Ethernet frame is encapsulated into the GEM frame, one field may be extended in a frame header of the GEM frame obtained through encapsulation, and is used to add a VPON ID. Because a length of the extended field is 8 bits, the extended field can support 256 VPONs. In this embodiment of the present invention, a structure of a GEM frame added with the VPON ID field, that is, an extended GEM frame, is shown in FIG. 5.

S405. Discard the Ethernet frame.

Figure 4:
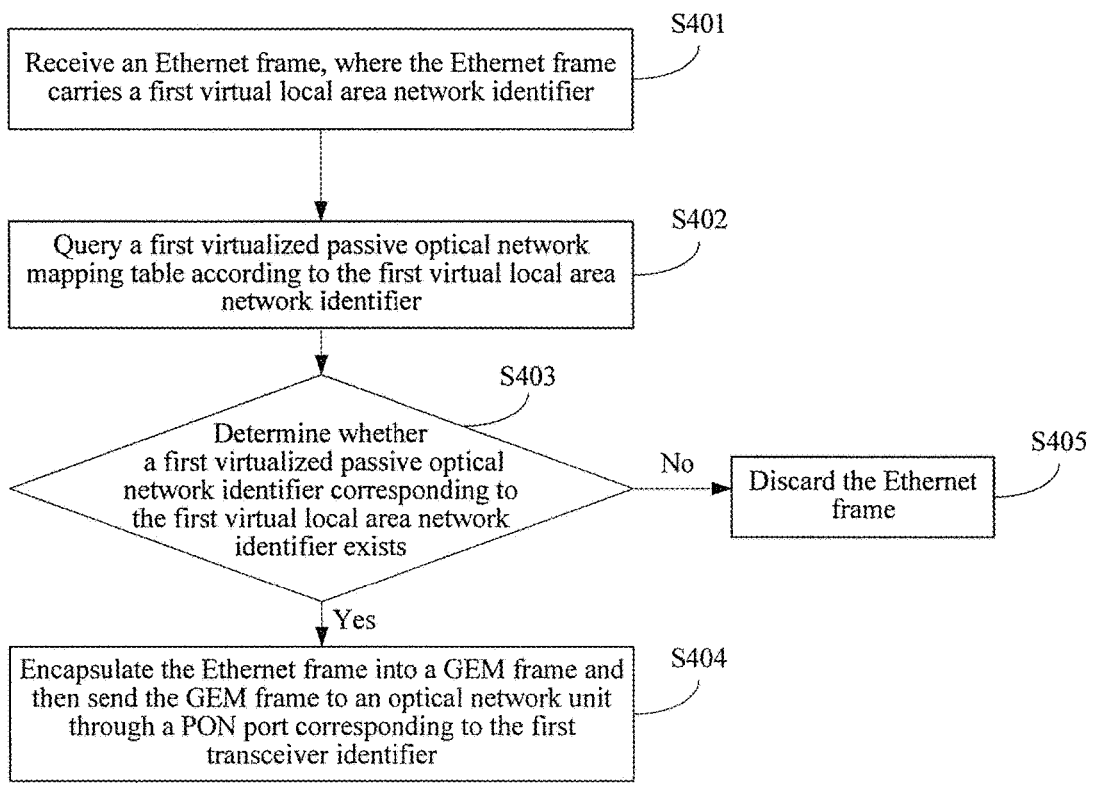
FIG. 4-a is a schematic flowchart of a method for forwarding, by an OLT, a downlink service flow in a virtualized passive optical network according to an embodiment of the present invention.

The method for forwarding, by an OLT, an uplink service flow shown in FIG. 4-*b* includes:

S'401. Receive a GEM frame, for example, receive a GEM frame that enters a virtualized MAC module from a PON port, where the GEM frame carries a second virtualized passive optical network identifier. For ease of description, the second virtualized passive optical network identifier is represented by a VPON ID2 in the following.

S'402. Query a first virtualized passive optical network mapping table according to the second virtualized passive optical network identifier.

An entry of the first virtualized passive optical network mapping table includes a virtual local area network identifier VLAN ID, and a VPON ID and a transceiver identifier TRx ID that correspond to the VLAN ID, as shown in Table 3.

S'403. Determine whether a second virtualized passive optical network identifier exists.

That is, the first virtualized passive optical network mapping table shown in Table 3 is queried for whether a VPON ID2 exists, and if yes, the procedure goes to S'404; otherwise, the procedure goes to S'405. As described above, the first virtualized passive optical network mapping table shown in Table 3 may also be queried for whether a VPON ID2 and a second transceiver identifier (the second transceiver identifier is represented by a TRx ID2 in the following description) that correspond to a second virtual local area network identifier (the second virtual local area network identifier is represented by a VLAN ID2 in the following description) exist, and if yes, the procedure goes to S'404.

S'404. Decapsulate the GEM frame.

That is, if the VPON ID2 is found in the first virtualized passive optical network mapping table shown in Table 3, or the VPON ID2 and the TRx ID2 that correspond to the VLAN ID2 are found in the first virtualized passive optical network mapping table shown in Table 3, the GEM frame is decapsulated. After the decapsulation, the Ethernet frame may be sent, according to the first virtualized passive optical network mapping table shown in Table 3, from an Ethernet port corresponding to the VLAN ID2.

S'405. Discard the GEM frame.

Figure 6:
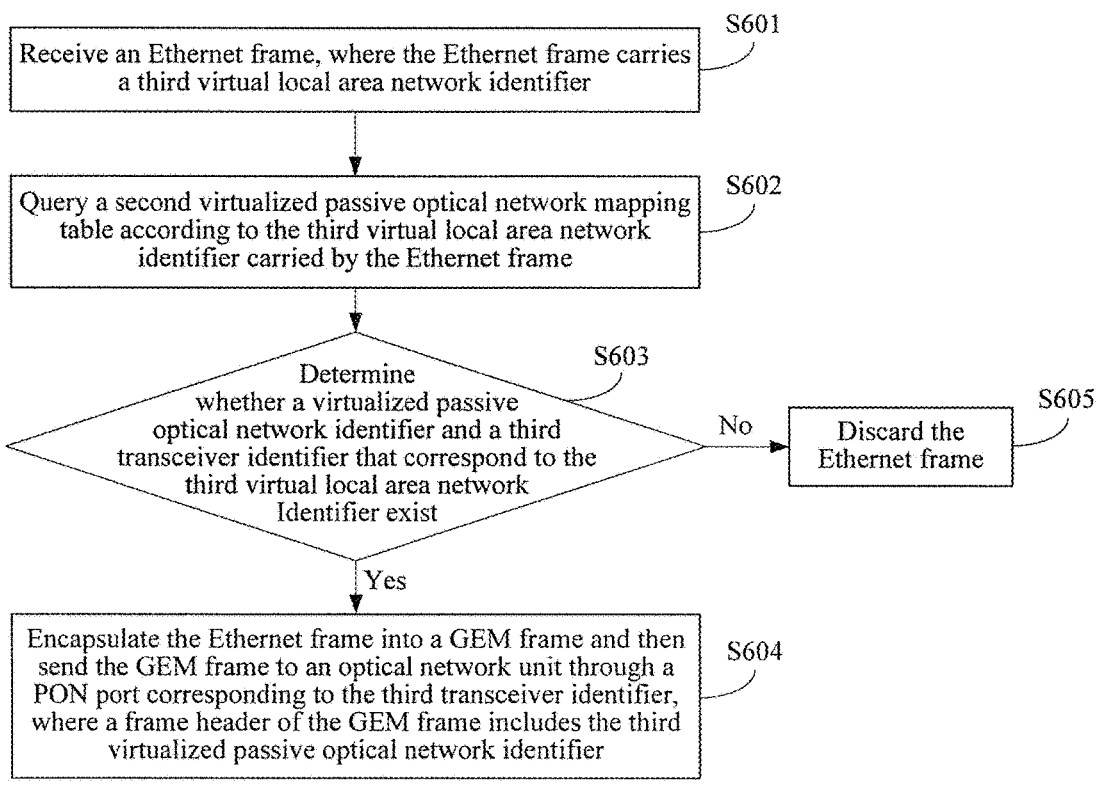
FIG. 6-a is a schematic flowchart of a method for forwarding, by an OLT, a downlink service flow in a virtualized passive optical network according to another embodiment of the present invention.

Corresponding to the embodiment in which the virtualized passive optical network creation message includes the VPON ID, the M ID, the ODN ID, and the at least one λ-flow ID, after the establishing, according to the VPON ID and the at least one λ-flow ID, a communication connection relationship with the at least one optical network unit in the virtualized passive optical network identified by the VPON ID, a method for forwarding, by an OLT, a downlink service flow shown in FIG. 6-*a* and a method for forwarding, by an OLT, an uplink service flow shown in FIG. 6-*b* are further included. The method for forwarding, by an OLT, a downlink service flow shown in FIG. 6-*a* is first described and includes:

S601. Receive an Ethernet frame, for example, receive an Ethernet frame that enters a virtualized MAC module from an Ethernet port, where the Ethernet frame carries a third virtual local area network identifier. For ease of description, the third virtual local area network identifier is represented by a VLAN ID3 in the following.

S602. Query a second virtualized passive optical network mapping table according to the third virtual local area network identifier carried by the Ethernet frame.

Different from the foregoing embodiments, in this embodiment, an entry of the second virtualized passive optical network mapping table includes a virtual local area network identifier VLAN ID, and a VPON ID, a transceiver identifier TRx ID, an M ID and/or an ODN ID that corresponds to the VLAN ID, and includes at least a VLAN ID, and a VPON ID and a TRx ID that correspond to the VLAN ID. Herein, it should be noted that, if all TRx IDs are different, actually, the entry of the second virtualized passive optical network mapping table does not need to include the M ID; and if optical modules identified by different M IDs include transceivers with a same TRx ID, the M ID and the TRx ID are required to uniquely identify one transceiver. Similarly, if identifiers of all ONUs are different, actually, the entry of the second virtualized passive optical network mapping table does not need to include the ODN ID; if ODNs identified by different ODN IDs include ONUs with a same identifier, the ODN ID and an identifier of an ONU are required to uniquely identify the ONU. The second virtualized passive optical network mapping table may be configured manually or may be configured automatically.

S603. Determine whether a third virtualized passive optical network identifier and a third transceiver identifier that correspond to the third virtual local area network identifier exist.

That is, the second virtualized passive optical network mapping table is queried for whether a third virtualized passive optical network identifier (for ease of description, the third virtualized passive optical network identifier is represented by a VPON ID3 in the following description) and a third transceiver identifier (for ease of description, the third transceiver identifier is represented by a TRx ID3 in the following description) that correspond to the VLAN ID3 exist, and if yes, the procedure goes to S604; otherwise, the procedure goes to S605. It should be noted that, because an entry of the second virtualized passive optical network mapping table includes fields such as a VLAN ID, and an VPON ID, an M ID, an ODN ID, and a TRx ID that correspond to the VLAN ID, the second virtualized passive optical network mapping table may also be queried for whether a VPON ID3, an optical module identifier 3 (M ID3), an optical distribution network identifier 3 (ODN ID3), and a TRx ID3 that correspond to the VLAN ID3 exist, and if yes, the procedure goes to S604.

S604. Encapsulate the Ethernet frame into a GEM frame and then send the GEM frame to an optical network unit through a PON port corresponding to the third transceiver identifier, where a frame header of the GEM frame includes the third virtualized passive optical network identifier.

That is, if the VPON ID3 and the optical module identifier 3 (M ID3) that correspond to the VLAN ID3 are found, or, if the VPON ID3, the TRx ID3, the optical module identifier 3 (M ID3), and the optical distribution network identifier 3 (ODN ID3) that correspond to the VLAN ID3 are found, the Ethernet frame is encapsulated into a GEM frame and then the GEM frame is sent to an optical network unit through a PON port corresponding to the TRx ID3, and this process is also a process of encapsulating the Ethernet frame into a GEM frame according to a GEM PORT in the second virtualized passive optical network mapping table. In this embodiment, when the Ethernet frame is encapsulated into the GEM frame, one field may be extended in a frame header of the GEM frame obtained through encapsulation, and is used to add a VPON ID. Because a length of the extended field is 8 bits, the extended field can support 256 VPONs. In this embodiment, a structure of a GEM frame added with the VPON ID field, that is, an extended GEM frame, is shown in FIG. 5.

S605. Discard the Ethernet frame.

The method for forwarding, by an OLT, an uplink service flow shown in FIG. 6-*b* includes:

S'601. Receive a GEM frame, for example, receive a GEM frame that enters a virtualized MAC module from a PON port, where the GEM frame carries a fourth virtualized passive optical network identifier. For ease of description, the fourth virtualized passive optical network identifier is represented by a VPON ID4 in the following description.

S'602. Query a second virtualized passive optical network mapping table according to the fourth virtualized passive optical network identifier.

An entry of the second virtualized passive optical network mapping table includes a virtual local area network identifier VLAN ID, and a VPON ID, a transceiver identifier TRx ID, an M ID and/or an ODN ID that corresponds to the VLAN ID, and includes at least a VLAN ID, and a VPON ID and a TRx ID that correspond to the VLAN ID. The second virtualized passive optical network mapping table may be configured manually or may be configured automatically.

S'603. Determine whether a fourth virtualized passive optical network identifier exists.

That is, the second virtualized passive optical network mapping table is queried for whether a VPON ID4 exists, and if yes, the procedure goes to S'604; otherwise, the procedure goes to S'605. Similar to the example shown in the foregoing FIG. 6-*a*, the second virtualized passive optical network mapping table may also be queried for whether a VPON ID4, an optical module identifier 4 (M ID4), an optical distribution network identifier 4 (ODN ID4), and a fourth transceiver identifier (TRx ID4) exist, and if yes, the procedure goes to S'604.

S'604. Decapsulate the GEM frame.

That is, if the VPON ID4 is found in the second virtualized passive optical network mapping table, or, if the second virtualized passive optical network mapping table is queried to find that the virtualized passive optical network identifier 4 (VPON ID4), the optical module identifier 4 (M ID4), the optical distribution network identifier 4 (ODN ID4), and the fourth transceiver identifier (TRx ID4) exist in the second virtualized passive optical network mapping table, the GEM frame is decapsulated.

S'605. Discard the GEM frame.

It can be known from the method for virtualizing a passive optical network provided by foregoing embodiments of the present invention that, a VPON ID included in a virtualized passive optical network creation message identifies a virtualized passive optical network formed by a virtualized optical line terminal and at least one optical network unit, and a communication connection relationship can be established, according to the VPON ID and at least one wavelength flow identifier, with the at least one optical network unit in the virtualized passive optical network identified by the VPON ID. Because a passive optical network and an optical line terminal therein are virtualized, a connection between an optical network unit and the optical line terminal is no longer limited to an actual physical connection, and flexible networking can be performed according to a user requirement. Therefore, according to the method provided by the embodiments of the present invention, on one hand, an increase in investment costs and complex operation administration maintenance caused by performing complex networking to deal with different application scenarios are avoided; on the other hand, a virtualized passive optical network identified by each VPON ID is created based on λ-flows of different attributes identified by λ-flow IDs, and an operation mode, a transmission rate and the like that correspond to each λ-flow may be software-defined. Therefore, a created VPON can fully meet various scenarios such as access of residential users, access of enterprise users, and wireless backhaul, and can resolve various problems brought by dealing with full-service access by using a single time-division channel.

Refer to FIG. 7, which is a schematic flowchart of a method for virtualizing a passive optical network according to another embodiment of the present invention. The method shown in FIG. 7 mainly includes step S701 and step S702, which are described in detail as follows:

S701. An optical network unit receives a delivered virtualized passive optical network creation message.

In this embodiment, the virtualized passive optical network creation message is delivered by an optical line terminal in a virtualized passive optical network, where included content is the same as content included in the virtualized passive optical network creation message provided by the foregoing embodiments, for example, an identifier VPON ID of a to-be-created virtualized passive optical network and at least one wavelength flow identifier λ-flow ID are included.

S702. The optical network unit establishes a λ-flow entry according to a VPON ID and a λ-flow ID, and reports registration information to an optical line terminal in a virtualized passive optical network identified by the VPON ID, to establish a communication connection relationship with the optical line terminal, where the registration information includes a λ-flow entry, and the λ-flow entry includes an optical network unit identifier and the λ-flow ID.

Figure 8:
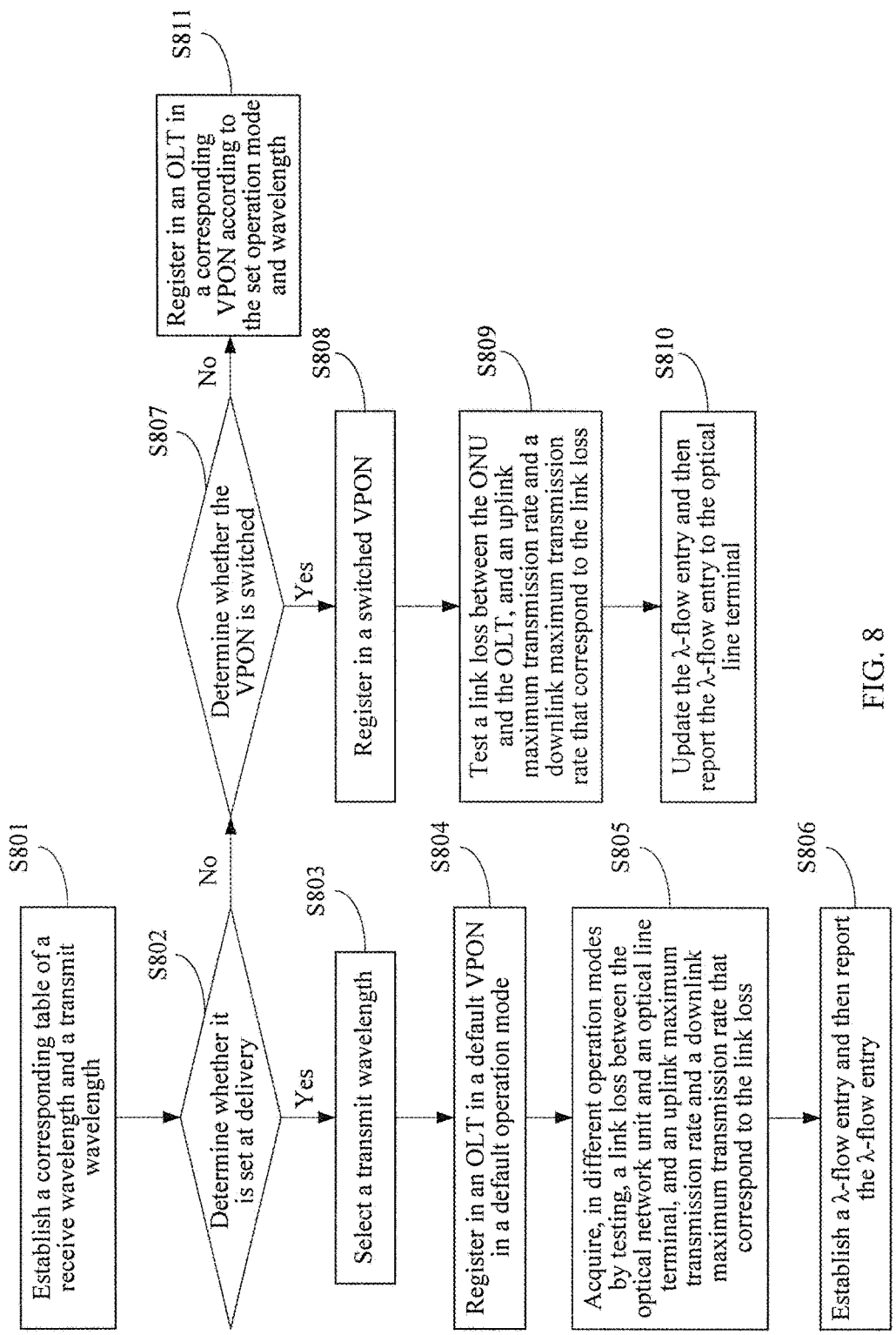
FIG. 8 is a schematic flowchart of registering, by an optical network unit, according to a VPON ID and a λ-flow ID, in an optical line terminal in a virtualized passive optical network identified by the VPON ID according to an embodiment of the present invention.

As an embodiment of the present invention, the establishing, by the optical network unit, a λ-flow entry according to the VPON ID and the λ-flow ID, and reporting registration information to an optical line terminal in a virtualized passive optical network identified by the VPON ID, to establish a communication connection relationship with the optical line terminal includes: acquiring, by testing, a link loss between the optical network unit and the optical line terminal, and an uplink maximum transmission rate and a downlink maximum transmission rate that correspond to the link loss; and adding the link loss, and the uplink maximum transmission rate and the downlink maximum transmission rate that correspond to the link loss to the wavelength flow λ-flow entry, to be used as registration information to be reported to the optical line terminal. A specific process includes step S801 to step S811, as shown in FIG. 8, and is described in detail as follows:

S801. Establish a table of a correspondence between a receive wavelength and a transmit wavelength.

In this embodiment of the present invention, the corresponding table of a receive wavelength and a transmit wavelength may be established by the optical network unit at delivery.

S802. Determine whether it is set at delivery.

If yes, the procedure goes to S803; otherwise, the procedure goes to S807.

S803. Select a transmit wavelength.

That is, a receive wavelength is selected according to a rule, and then a transmit wavelength is selected according to the corresponding table of a receive wavelength and a transmit wavelength.

S804. Register in an OLT in a default VPON in a default operation mode.

S805. Acquire, in different operation modes by testing, a link loss between the optical network unit and the optical line terminal, and an uplink maximum transmission rate and a downlink maximum transmission rate that correspond to the link loss.

S806. Establish a λ-flow entry and then report the λ-flow entry.

That is, the optical network unit adds content, which is acquired by testing, such as the link loss, and the uplink maximum transmission rate and the downlink maximum transmission rate that correspond to the link loss, to the wavelength flow λ-flow entry, to be used as registration information to be reported to the optical line terminal.

S807. Determine whether the VPON is switched.

The switching of the VPON means that an object registered by the optical network unit is about to change. Therefore, when it is determined that the optical network unit is not set at delivery, it should be further determined whether the VPON is switched, and it may be determined, by determining whether a VPON ID is changed, whether the VPON is switched. If the VPON ID has been changed, the procedure goes to S808; otherwise, the procedure goes to S811.

S808. Register in a switched VPON.

Specifically, the optical network unit may register in the switched VPON according to the set operation mode and wavelength.

S809. Test a link loss between the ONU and the OLT, and an uplink maximum transmission rate and a downlink maximum transmission rate that correspond to the link loss.

S810. Update the λ-flow entry and then report the λ-flow entry to the optical line terminal.

S811. Register in an OLT in a corresponding VPON according to the set operation mode and wavelength.

Similar to the foregoing embodiments, the λ-flow entry shown in FIG. 7 or FIG. 8 includes a λ-flow ID, or, the λ-flow entry includes a λ-flow ID, an optical module identifier M ID, and an optical distribution network identifier ODN ID, where the M ID is used to identify an optical module to which a wavelength flow identified by the λ-flow ID belongs, and the ODN ID is used to identify an optical distribution network to which the wavelength flow identified by the λ-flow ID belongs. Specific fields are shown in the foregoing embodiments or Table 1 in the foregoing embodiments.

As described above, an ultimate objective of establishing, by an OLT, a communication connection relationship with an optical network unit in a virtualized passive optical network is that an uplink service flow and a downlink service flow can be forwarded. Similarly, in this embodiment of the present invention, corresponding to the embodiment in which the virtualized passive optical network creation message includes the VPON ID and the at least one λ-flow ID, and the λ-flow entry includes the λ-flow ID, after the registering, by the optical network unit, according to the VPON ID and the λ-flow ID, in an optical line terminal in a virtualized passive optical network identified by the VPON ID, to establish a communication connection relationship with the optical line terminal, a method for forwarding, by an ONU, a downlink service flow shown in FIG. 9-a and a method for forwarding, by an ONU, an uplink service flow shown in FIG. 9-b are further included. The method for forwarding, by an ONU, a downlink service flow shown in FIG. 9-a is first described and includes:

S901. Receive a GEM frame, for example, receive a GEM frame that enters a virtualized MAC module from a PON port, where the GEM frame carries a fifth virtualized passive optical network identifier. For ease of description, the fifth virtualized passive optical network identifier is represented by a VPON ID5 in the following description.

S902. Query a third virtualized passive optical network mapping table according to the fifth virtualized passive optical network identifier.

An entry of the third virtualized passive optical network mapping table includes a VPON ID, and a GEM port identifier, an Ethernet port identifier, and a virtual local area network identifier VLAN ID that correspond to the VPON ID, as shown in the following Table 4:

TABLE 4

| ETH PORT | VLAN ID | VPON ID | GEM PORT |
|----------|---------|---------|----------|
| 1        | 100     | 100     | 1001     |
| 2        | 101     | 100     | 1002     |

S903. Determine whether a fifth virtualized passive optical network identifier exists.

That is, the third virtualized passive optical network mapping table shown in Table 4 is queried for whether a VPON ID5 exists, and if yes, the procedure goes to S904; otherwise, the procedure goes to S905.

S904. Decapsulate the GEM frame.

That is, if the VPON ID5 is found in the third virtualized passive optical network mapping table shown in Table 4, the GEM frame is decapsulated.

S905. Discard the GEM frame.

The method for forwarding, by an ONU, an uplink service flow shown in FIG. 9-b includes:

S'901. Receive an Ethernet frame, for example, receive an Ethernet frame that enters a virtualized MAC module from an Ethernet port, where the Ethernet frame carries a sixth virtual local area network identifier. For ease of description, the sixth virtual local area network identifier is represented by a VLAN ID6 in the following description.

S'902. Query a third virtualized passive optical network mapping table according to the sixth virtual local area network identifier.

In this embodiment, same as the third virtualized passive optical network mapping table shown in FIG. 9-a, the third virtualized passive optical network mapping table is shown in the foregoing Table 4.

S'903. If a sixth virtualized passive optical network identifier (the sixth virtualized passive optical network identifier is represented by a VPON ID6 in the following description) corresponding to the sixth virtual local area network identifier is found in the third virtualized passive optical network mapping table, encapsulate the Ethernet frame into a GEM frame and then send the GEM frame to an optical line terminal through a PON port, where a frame header of the GEM frame includes the VPON ID6. Specifically, when the Ethernet frame is encapsulated into the GEM frame, one field may be extended in a frame header of the GEM frame obtained through encapsulation, and is used to add the VPON ID6.

Corresponding to the embodiment in which the virtualized passive optical network creation message includes the VPON ID and the at least one λ-flow ID, and the λ-flow entry includes the M ID, the ODN ID, and the λ-flow ID, after the registering, by the optical network unit, according to the VPON ID and the λ-flow ID, in an optical line terminal in a virtualized passive optical network identified by the VPON ID, to establish a communication connection relationship with the optical line terminal, a method for forwarding, by an ONU, a downlink service flow shown in FIG. 10-a and a method for forwarding, by an ONU, an uplink service flow shown in FIG. 10-b are further included. The method for forwarding, by an ONU, a downlink service flow shown in FIG. 10-a is first described and includes:

S1001. Receive a GEM frame, for example, receive a GEM frame that enters a virtualized MAC module from a PON port, where the GEM frame carries a seventh virtualized passive optical network identifier. For ease of description, the seventh virtualized passive optical network identifier is represented by a VPON ID7 in the following description.

S1002. Query a fourth virtualized passive optical network mapping table according to the seventh virtualized passive optical network identifier.

An entry of the fourth virtualized passive optical network mapping table includes a VPON ID, and a GEM port identifier, an ODN ID, an Ethernet port identifier and/or a virtual local area network identifier VLAN ID that corresponds to the VPON ID, and include at least a VPON ID, and a GEM port identifier, an Ethernet port identifier, and a VLAN ID that correspond to the VPON ID. Herein, it should be noted that, if identifiers of all ONUs are different, actually, the entry of the fourth virtualized passive optical network mapping table does not need to include the ODN ID; if ODNs identified by different ODN IDs include ONUs with a same identifier, the ODN ID and an identifier of an ONU are required to uniquely identify the ONU. The fourth virtualized passive optical network mapping table may be configured manually or may be configured automatically.

S1003. Determine whether a seventh virtualized passive optical network identifier exists.

That is, the fourth virtualized passive optical network mapping table is queried for whether the VPON ID7 exists, and if yes, the procedure goes to S1004; otherwise, the procedure goes to S1005.

S1004. Decapsulate the GEM frame.

That is, if the VPON ID7, and a GEM port identifier and an optical distribution network identifier 7 (ODN ID7) that correspond to the VPON ID7 are found in the fourth virtualized passive optical network mapping table, the GEM frame is decapsulated. It should be noted that, because an entry of the fourth virtualized passive optical network mapping table includes fields such as a VLAN ID, and a VPON ID and an ODN ID that correspond to the VLAN ID, the fourth virtualized passive optical network mapping table may also be queried for whether a VPON ID7 and an optical distribution network identifier 7 (ODN ID7) that correspond to a seventh virtual local area network identifier (VLAN ID7) exist, and if yes, the GEM frame is decapsulated.

S1005. Discard the GEM frame.

The method for forwarding, by an ONU, an uplink service flow shown in FIG. 10-b includes:

S'1001. Receive an Ethernet frame, for example, receive an Ethernet frame that enters a virtualized MAC module from an Ethernet port, where the Ethernet frame carries an eighth virtual local area network identifier. For ease of description, the eighth virtual local area network identifier is represented by a VLAN ID8 in the following description.

S'1002. Query a fourth virtualized passive optical network mapping table according to the eighth virtual local area network identifier.

In this embodiment, an entry of the fourth virtualized passive optical network mapping table includes a VPON ID, and a GEM port identifier, an ODN ID, an Ethernet port identifier and/or a virtual local area network identifier VLAN ID that corresponds to the VPON ID, and includes at least a VPON ID, and a GEM port identifier, an Ethernet port identifier, and a VLAN ID that correspond to the VPON ID.

S'1003. If an eighth virtualized passive optical network identifier corresponding to the eighth virtual local area network identifier is found in the fourth virtualized passive optical network mapping table, encapsulate the Ethernet frame into a GEM frame and then send the GEM frame to an optical line terminal through a PON port, where a frame header of the GEM frame includes the eighth virtual local area network identifier.

Similar to the foregoing embodiment, the fourth virtualized passive optical network mapping table may also be queried for whether a VPON ID8 and an optical distribution network identifier 8 (ODN ID8) that correspond to the Ethernet port identifier exist, and if yes, the Ethernet frame is encapsulated into a GEM frame and then the GEM frame is sent to a virtualized optical line terminal through a PON port, where a frame header of the GEM frame includes the VPON ID8. Specifically, when the Ethernet frame is encapsulated into the GEM frame, one field may be extended in a frame header of the GEM frame obtained through encapsulation, and is used to add the VPON ID8.

Refer to FIG. 11, which is a schematic structural diagram of an apparatus for virtualizing a passive optical network according to an embodiment of the present invention. For ease of description, only parts related to this embodiment of the present invention are shown. The apparatus for virtualizing a passive optical network shown in FIG. 11 includes a message receiving module 1101 and a communication connection establishing module 1102.

The message receiving module 1101 is configured to receive a virtualized passive optical network creation message, where the virtualized passive optical network creation message includes an identifier VPON ID of a to-be-created virtualized passive optical network and at least one wavelength flow identifier λ-flow ID, the VPON ID is used to identify the virtualized passive optical network formed by a virtualized optical line terminal and the at least one optical network unit, and the λ-flow ID is used to identify one wavelength flow.

The communication connection establishing module 1102 is configured to establish, according to the VPON ID and the at least one λ-flow ID that are included in the virtualized passive optical network creation message, a communication connection relationship with the at least one optical network unit in the virtualized passive optical network identified by the VPON ID.

It should be noted that, in the foregoing implementation manner of the apparatus for virtualizing a passive optical network, division of the functional modules is merely used as an example for description. In an actual application, the foregoing functions may be allocated, according to requirements, for example, in consideration of a configuration requirement of corresponding hardware or convenience of software implementation, to different functional modules for completion, that is, the internal structure of the apparatus for virtualizing a passive optical network is divided into different functional modules, to complete all or some of functions in the foregoing description. Moreover, in an actual application, corresponding functional modules in this embodiment may be implemented by corresponding hardware, or may be completed by executing corresponding software by corresponding hardware. For example, the foregoing message receiving module may be hardware executing the receiving a virtualized passive optical network creation message sent by an upper management and control module, for example, a message receiver, or may be a general processor or another hardware device that can execute a corresponding computer program to complete the foregoing function. For another example, the foregoing communication connection establishing module may be hardware having a function of executing the establishing, according to the VPON ID and the at least one λ-flow ID that are included in the virtualized passive optical network creation message, a communication connection relationship with the at least one optical network unit in the virtualized passive optical network identified by the VPON ID, for example, a communication connection establisher, or may be a general processor or another hardware device that can execute a corresponding computer program to complete the foregoing function (the foregoing description principle may be applied to each embodiment provided by this specification).

The communication connection establishing module 1102 shown in FIG. 11 may include a first sending unit 1201, a first receiving unit 1202, and a first establishing unit 1203, as an apparatus for virtualizing a passive optical network provided by another embodiment of the present invention and shown in FIG. 12.

The first sending unit 1201 is configured to send the virtualized passive optical network creation message to the at least one optical network unit.

The first receiving unit 1202 is configured to receive registration information that is registered in an optical line terminal and returned by the at least one optical network unit, where the registration information includes a wavelength flow λ-flow entry, and the λ-flow entry includes an optical network unit identifier and the λ-flow ID.

The first establishing unit 1203 is configured to establish a first registration mapping table according to the VPON ID and the λ-flow entry, where the first registration mapping table includes the VPON ID and at least one λ-flow entry.

The apparatus for virtualizing a passive optical network shown in FIG. 11 or FIG. 12 further includes a first receiving module 1301, a first querying module 1302, and a first forwarding module 1303, as an apparatus for virtualizing a passive optical network provided by another embodiment of the present invention and shown in FIG. 13-a or FIG. 13-b. The first receiving module 1301, the first querying module 1302, and the first forwarding module 1303 are configured to forward a downlink service flow.

The first receiving module 1301 is configured to receive an Ethernet frame, where the Ethernet frame carries a first virtual local area network identifier.

The first querying module 1302 is configured to query a first virtualized passive optical network mapping table according to the first virtual local area network identifier, where an entry of the first virtualized passive optical network mapping table includes a virtual local area network identifier VLAN ID, and a VPON ID and a transceiver identifier TRx ID that correspond to the VLAN ID, as shown in Table 3.

The first forwarding module 1303 is configured to: if the first querying module 1302 finds a first virtualized passive optical network identifier (VPON ID1) corresponding to the first virtual local area network identifier (VLAN ID1), encapsulate the Ethernet frame into a GEM frame and then send the GEM frame to an optical network unit through a PON port corresponding to a first transceiver identifier (TRx ID1), where a frame header of the GEM frame includes the VPON ID1. Actually, in the first virtualized passive optical network mapping table shown in Table 3, the VLAN ID also corresponds to a TRx ID, and therefore, the first querying module 1302 may also query the first virtualized passive optical network mapping table shown in Table 3 for whether the VPON ID1 and the TRx ID1 that correspond to the VLAN ID1 exist, and if yes, the first forwarding module 1303 encapsulates the Ethernet frame into a GEM frame, and then send the GEM frame to the optical network unit through the corresponding PON port.

The apparatus for virtualizing a passive optical network shown in FIG. 11 or FIG. 12 further includes a second receiving module 1401, a second querying module 1402, and a first decapsulation module 1403, as an apparatus for virtualizing a passive optical network provided by another embodiment of the present invention and shown in FIG. 14-a or FIG. 14-b.

The second receiving module 1401 is configured to receive a GEM frame, where the GEM frame carries a second virtualized passive optical network identifier (VPON ID2).

The second querying module 1402 is configured to query the first virtualized passive optical network mapping table according to the second virtualized passive optical network identifier (VPON ID2) carried by the GEM frame, where an entry of the first virtualized passive optical network mapping table includes a virtual local area network identifier VLAN ID, and a VPON ID and a transceiver identifier TRx ID that correspond to the VLAN ID, as shown in Table 3.

The first decapsulation module 1403 is configured to: if the second virtualized passive optical network identifier is found in the first virtualized passive optical network mapping table, decapsulate the GEM frame. As described above, in the first virtualized passive optical network mapping table shown in Table 3, the VLAN ID also corresponds to a TRx ID, and therefore, the second querying module 1402 may also query the first virtualized passive optical network mapping table shown in Table 3 for whether a VPON ID2 and a second transceiver identifier (TRx ID2) that correspond to a second virtual local area network identifier (VLAN ID2) exist, and if yes, the first decapsulation module 1403 decapsulates the GEM frame.

In the apparatus for virtualizing a passive optical network shown in FIG. 11, if in addition to including the identifier VPON ID of the to-be-created virtualized passive optical network and the at least one wavelength flow identifier λ-flow ID, the virtualized passive optical network creation message further includes an optical module identifier M ID and an optical distribution network identifier ODN ID, where the M ID is used to identify an optical module to which a wavelength flow identified by the λ-flow ID belongs, and the ODN ID is used to identify an optical distribution network to which the wavelength flow identified by the λ-flow ID belongs, the communication connection establishing module shown in FIG. 11 may include a second sending unit 1501, a second receiving unit 1502, and a second establishing unit 1503, as an apparatus for virtualizing a passive optical network provided by another embodiment of the present invention and shown in FIG. 15.

The second sending unit 1501 is configured to send, to the at least one optical network unit, the virtualized passive optical network creation message that carries the M ID.

The second receiving unit 1502 is configured to receive registration information that is registered in the virtualized optical line terminal and returned by the at least one optical network unit, where the registration information includes a wavelength flow λ-flow entry, and the λ-flow entry includes the ODN ID and the M ID.

The second establishing unit 1503 is configured to establish a second registration mapping table according to the VPON ID and the λ-flow entry, where the second registration mapping table includes the VPON ID and at least one λ-flow entry.

Figure 16:
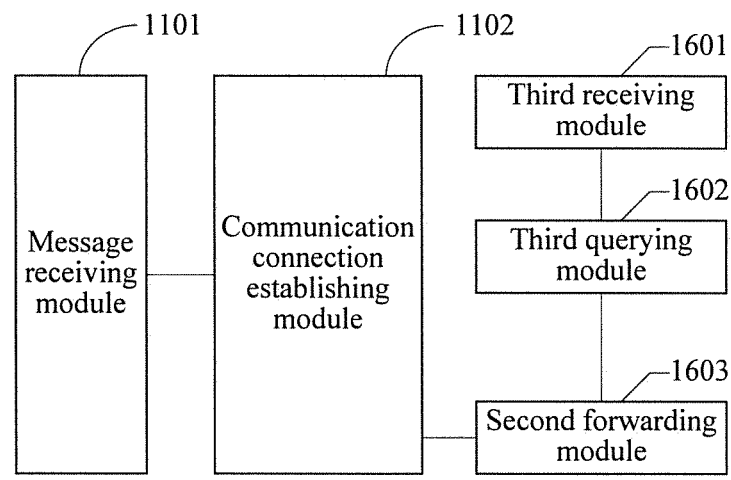
FIG. 16 is a schematic structural diagram of an apparatus for virtualizing a passive optical network according to another embodiment of the present invention.

In the apparatus for virtualizing a passive optical network shown in FIG. 11, if in addition to including the identifier VPON ID of the to-be-created virtualized passive optical network and the at least one wavelength flow identifier λ-flow ID, the virtualized passive optical network creation message further includes an optical module identifier M ID and an optical distribution network identifier ODN ID, where the M ID is used to identify an optical module to which a wavelength flow identified by the λ-flow ID belongs, and the ODN ID is used to identify an optical distribution network to which the wavelength flow identified by the λ-flow ID belongs, the apparatus for virtualizing a passive optical network shown in FIG. 11 may further include a third receiving module 1601, a third querying module 1602, and a second forwarding module 1603, as an apparatus for virtualizing a passive optical network provided by another embodiment of the present invention and shown in FIG. 16.

The third receiving module 1601 is configured to receive an Ethernet frame, where the Ethernet frame carries a third virtual local area network identifier (VLAN ID3).

The third querying module 1602 is configured to query a second virtualized passive optical network mapping table according to the third virtual local area network identifier carried by the Ethernet frame, where an entry of the second virtualized passive optical network mapping table includes a virtual local area network identifier VLAN ID, and a VPON ID, a transceiver identifier TRx ID, an M ID and/or an ODN ID that corresponds to the VLAN ID, and includes at least a VLAN ID, and a VPON ID and a TRx ID that correspond to the VLAN ID.

The second forwarding module 1603 is configured to: if a third virtualized passive optical network identifier (VPON ID3) and a third transceiver identifier (TRx ID3) that correspond to the third virtual local area network identifier are found, encapsulate the Ethernet frame into a GEM frame and then send the GEM frame to an optical network unit through a PON port corresponding to the TRx ID3. It should be noted that, an entry of the second virtualized passive optical network mapping table includes fields such as a VLAN ID, and a VPON ID, an M ID, an ODN ID, and a TRx ID that correspond to the VLAN ID, and therefore, the third querying module 1602 may also query the second virtualized passive optical network mapping table for whether the third virtualized passive optical network identifier (VPON ID3), an optical module identifier 3 (M ID3), an optical distribution network identifier 3 (ODN ID3), and the third transceiver identifier (TRx ID3) that correspond to the third virtual local area network identifier 3 (VLAN ID3) exist, and if yes, the second forwarding module 1603 encapsulates the Ethernet frame into a GEM frame and then sends the GEM frame to the optical network unit through the PON port corresponding to the TRx ID3.

Figure 17:
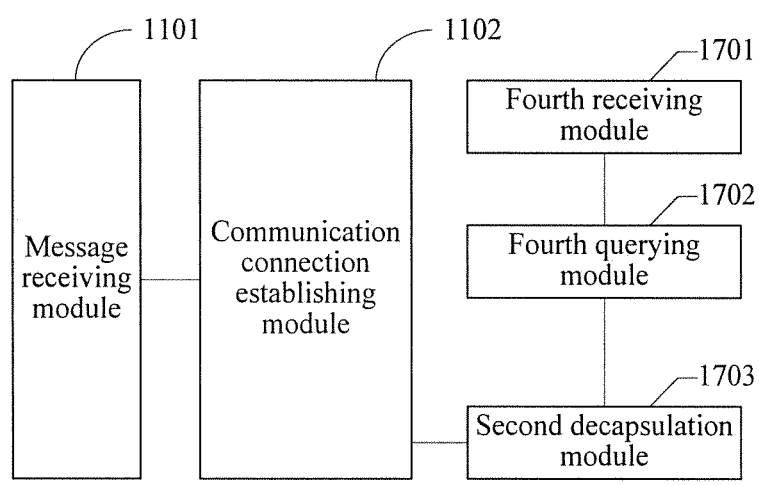
FIG. 17 is a schematic structural diagram of an apparatus for virtualizing a passive optical network according to another embodiment of the present invention.

In the apparatus for virtualizing a passive optical network shown in FIG. 11, if in addition to including the identifier VPON ID of the to-be-created virtualized passive optical network and the at least one wavelength flow identifier λ-flow ID, the virtualized passive optical network creation message further includes an optical module identifier M ID and an optical distribution network identifier ODN ID, where the M ID is used to identify an optical module to which a wavelength flow identified by the λ-flow ID belongs, and the ODN ID is used to identify an optical distribution network to which the wavelength flow identified by the λ-flow ID belongs, the apparatus for virtualizing a passive optical network shown in FIG. 11 may further include a fourth receiving module 1701, a fourth querying module 1702, and a second decapsulation module 1703, as an apparatus for virtualizing a passive optical network provided by another embodiment of the present invention and shown in FIG. 17.

The fourth receiving module 1701 is configured to receive a GEM frame, where the GEM frame carries a fourth virtualized passive optical network identifier (VPON ID4).

The fourth querying module 1702 is configured to query a second virtualized passive optical network mapping table according to the fourth virtualized passive optical network identifier carried by the GEM frame, where an entry of the second virtualized passive optical network mapping table includes a virtual local area network identifier VLAN ID, and a VPON ID, a transceiver identifier TRx ID, an M ID and/or an ODN ID that corresponds to the VLAN ID, and includes at least a VLAN ID, and a VPON ID and a TRx ID that correspond to the VLAN ID.

The second decapsulation module 1703 is configured to: if the fourth virtualized passive optical network identifier is found in the second virtualized passive optical network mapping table, decapsulate the GEM frame. Similar to the example shown in the foregoing FIG. 17, the fourth querying module 1702 may also query the second virtualized passive optical network mapping table for whether the VPON ID4, an optical module identifier 4 (M ID4), an optical distribution network identifier 4 (ODN ID4), and a fourth transceiver identifier (TRx ID4) exist, and if yes, the second decapsulation module 1703 decapsulates the GEM frame.

Refer to FIG. 18, which is a schematic structural diagram of an apparatus for virtualizing a passive optical network according to another embodiment of the present invention. For ease of description, only parts related to this embodiment of the present invention are shown. The apparatus for virtualizing a passive optical network shown in FIG. 18 may be an optical network unit in a VPON provided by this embodiment of the present invention or a functional module/unit in an optical network unit, and includes a creation message receiving module 1801 and a registration module 1802.

The creation message receiving module 1801 is configured to receive a delivered virtualized passive optical network creation message, where the virtualized passive optical network creation message includes an identifier VPON ID of a to-be-created virtualized passive optical network and at least one wavelength flow identifier λ-flow ID.

The registration module 1802 is configured to establish a λ-flow entry according to the VPON ID and the λ-flow ID, and report registration information to an optical line terminal in the virtualized passive optical network identified by the VPON ID, to establish a communication connection relationship with the optical line terminal, where the registration information includes a λ-flow entry, and the λ-flow entry includes an optical network unit identifier and the λ-flow ID.

The registration module shown in FIG. 18 may include an acquiring unit 1901 and a reporting unit 1902, as an apparatus for virtualizing a passive optical network provided by another embodiment of the present invention and shown in FIG. 19.

The acquiring unit 1901 is configured to acquire, by testing, a link loss between the optical network unit and the optical line terminal, and an uplink maximum transmission rate and a downlink maximum transmission rate that correspond to the link loss.

The reporting unit 1902 is configured to add the link loss, and the uplink maximum transmission rate and the downlink maximum transmission rate that correspond to the link loss to the wavelength flow λ-flow entry, to be used as registration information to be reported to the optical line terminal.

The apparatus for virtualizing a passive optical network shown in FIG. 18 or FIG. 19 may further include a fifth receiving module 2001, a fifth querying module 2002, and a third decapsulation module 2003, as an apparatus for virtualizing a passive optical network provided by another embodiment of the present invention and shown in FIG. 20-*a* or FIG. 20-*b*.

The fifth receiving module 2001 is configured to receive a GEM frame, where the GEM frame carries a fifth virtualized passive optical network identifier (VPON ID5).

The fifth querying module 2002 is configured to query a third virtualized passive optical network mapping table according to the fifth virtual local area network identifier carried by the GEM frame, where an entry of the third virtualized passive optical network mapping table includes a VPON ID, and a GEM port identifier, an Ethernet port identifier, and a virtual local area network identifier VLAN ID that correspond to the VPON ID.

The third decapsulation module 2003 is configured to: if the fifth virtualized passive optical network identifier is found in the third virtualized passive optical network mapping table, decapsulate the GEM frame.

In the apparatus for virtualizing a passive optical network shown in FIG. 18, the λ-flow entry includes the λ-flow ID, and the apparatus for virtualizing a passive optical network shown in FIG. 18 or FIG. 19 may further include a sixth receiving module 2101, a sixth querying module 2102, and a third forwarding module 2103, as an apparatus for virtualizing a passive optical network provided by another embodiment of the present invention and shown in FIG. 21-*a* or FIG. 21-*b*.

The sixth receiving module 2101 is configured to receive an Ethernet frame, where the Ethernet frame carries a sixth virtual local area network identifier (VLAN ID6).

The sixth querying module 2102 is configured to query a third virtualized passive optical network mapping table according to the sixth virtual local area network identifier carried by the Ethernet frame, where an entry of the third virtualized passive optical network mapping table includes a VPON ID, and a GEM port identifier, an Ethernet port identifier, and a virtual local area network identifier VLAN ID that correspond to the VPON ID.

The third forwarding module 2103 is configured to: if a sixth virtualized passive optical network identifier (VPON ID6) corresponding to the sixth virtual local area network identifier is found in the third virtualized passive optical network mapping table, encapsulate the Ethernet frame into a GEM frame and then send the GEM frame to an optical line terminal through a PON port, where a frame header of the GEM frame includes the VPON ID6. Specifically, when the Ethernet frame is encapsulated into the GEM frame, one field may be extended in a frame header of the GEM frame obtained through encapsulation, and is used to add the VPON ID6.

Figure 22:
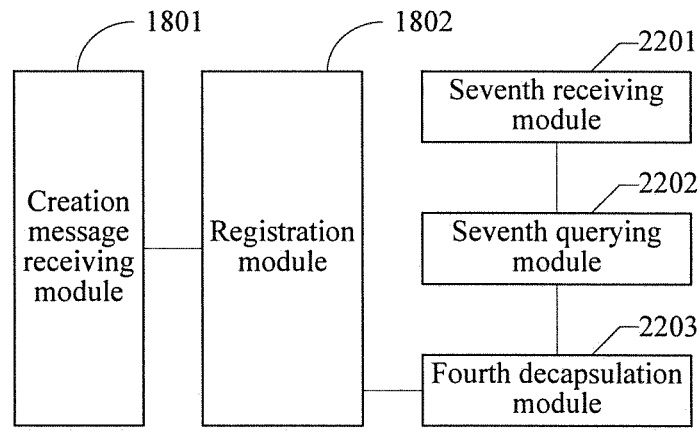
FIG. 22 is a schematic structural diagram of an apparatus for virtualizing a passive optical network according to another embodiment of the present invention.

In the apparatus for virtualizing a passive optical network shown in FIG. 18, in addition to including the λ-flow ID, the λ-flow entry may further include an optical module identifier M ID, and an optical distribution network identifier ODN ID, where the M ID is used to identify an optical module to which a wavelength flow identified by the λ-flow ID belongs, and the ODN ID is used to identify an optical distribution network to which the wavelength flow identified by the λ-flow ID belongs. The apparatus for virtualizing a passive optical network shown in FIG. 18 may further include a seventh receiving module 2201, a seventh querying module 2202, and a fourth decapsulation module 2203, as an apparatus for virtualizing a passive optical network provided by another embodiment of the present invention and shown in FIG. 22.

The seventh receiving module 2201 is configured to receive a GEM frame, where the GEM frame carries a seventh virtualized passive optical network identifier (VPON ID7).

The seventh querying module 2202 is configured to query a fourth virtualized passive optical network mapping table according to the seventh virtualized passive optical network identifier carried by the GEM frame, where an entry of the fourth virtualized passive optical network mapping table includes a VPON ID, and a GEM port identifier, an ODN ID, an Ethernet port identifier and/or a virtual local area network identifier VLAN ID that corresponds to the VPON ID, and includes at least a VPON ID, and a GEM port identifier, an Ethernet port identifier, and a VLAN ID that correspond to the VPON ID. Herein, it should be noted that, if identifiers of all ONUs are different, actually, the entry of the fourth virtualized passive optical network mapping table does not need to include the ODN ID; if ODNs identified by different ODN IDs include ONUs with a same identifier, the ODN ID and an identifier of an ONU are required to uniquely identify the ONU. The fourth virtualized passive optical network mapping table may be configured manually or may be configured automatically.

The fourth decapsulation module 2203 is configured to: if the seventh virtualized passive optical network identifier is found in the fourth virtualized passive optical network mapping table, decapsulate the GEM frame.

Figure 23:
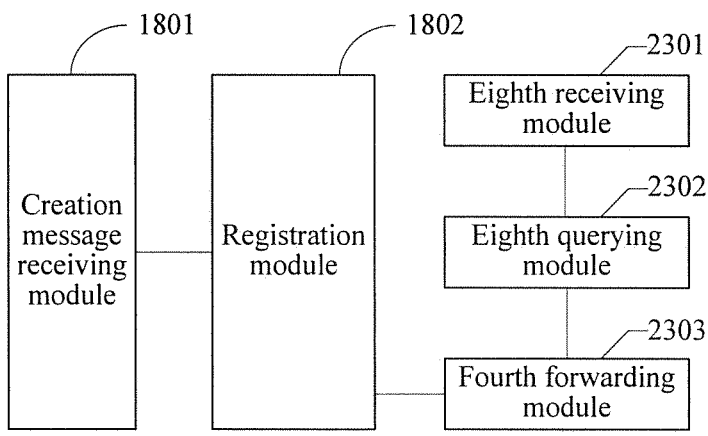
FIG. 23 is a schematic structural diagram of an apparatus for virtualizing a passive optical network according to another embodiment of the present invention.

In the apparatus for virtualizing a passive optical network shown in FIG. 18, in addition to including the λ-flow ID, the λ-flow entry may further include an optical module identifier M ID, and an optical distribution network identifier ODN ID, where the M ID is used to identify an optical module to which a wavelength flow identified by the λ-flow ID belongs, and the ODN ID is used to identify an optical distribution network to which the wavelength flow identified by the λ-flow ID belongs. The apparatus for virtualizing a passive optical network shown in FIG. 18 may include an eighth receiving module 2301, an eighth querying module 2302, and a fourth forwarding module 2303, as an apparatus for virtualizing a passive optical network provided by another embodiment of the present invention and shown in FIG. 23.

The eighth receiving module 2301 is configured to receive an Ethernet frame, where the Ethernet frame carries an eighth virtual local area network identifier (VLAN ID8).

The eighth querying module 2302 is configured to query a fourth virtualized passive optical network mapping table according to the eighth virtual local area network identifier carried by the Ethernet frame, where an entry of the fourth virtualized passive optical network mapping table includes a VPON ID, and a GEM port identifier, an ODN ID, an Ethernet port identifier and/or a virtual local area network identifier VLAN ID that corresponds to the VPON ID, and includes at least a VPON ID, and a GEM port identifier, an Ethernet port identifier, and a VLAN ID that correspond to the VPON ID.

The fourth forwarding module 2303 is configured to: if an eighth virtualized passive optical network identifier (VPON ID8) and an optical distribution network identifier ODN ID8 that correspond to the eighth virtual local area network identifier are found in the fourth virtualized passive optical network mapping table, add the VPON ID8 to the Ethernet frame and then send the Ethernet frame to a virtualized optical line terminal through a PON port. It should be noted that, because an entry of the fourth virtualized passive optical network mapping table includes fields such as a VLAN ID, and a VPON ID and an ODN ID that correspond to the VLAN ID, the seventh querying module 2301 may also query the fourth virtualized passive optical network mapping table for whether an eighth virtualized passive optical network identifier (VPON ID8) and an optical distribution network identifier 8 (ODN ID8) that correspond to the GEM port identifier exist, and if yes, the fourth forwarding module 2302 adds the VPON ID8 to the GEM frame and then sends the GEM frame to a virtualized optical line terminal through a corresponding PON port.

Figure 24:
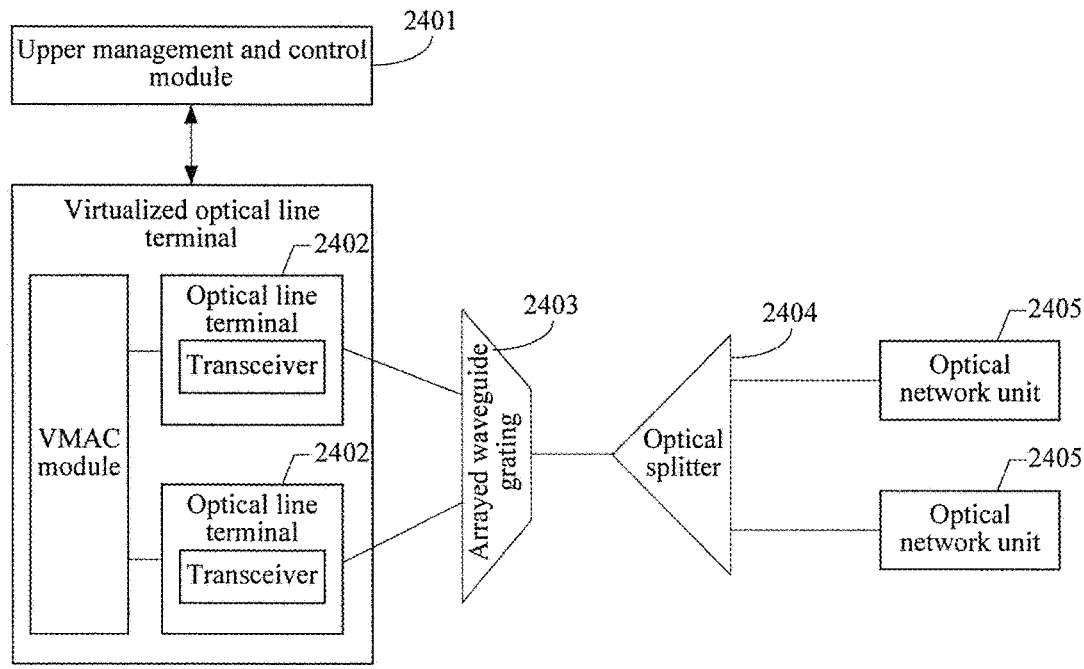
FIG. 24 is a schematic structural diagram of a passive optical network virtualization system according to an embodiment of the present invention.

Refer to FIG. 24, which is a schematic structural diagram of a passive optical network virtualization system according to an embodiment of the present invention. For ease of description, only parts related to this embodiment of the present invention are shown. The passive optical network virtualization system shown in FIG. 24 includes an upper management and control module 2401, at least one optical line terminal 2402, an arrayed waveguide grating 2403, an optical splitter 2404, and at least one optical network unit 2405, where the optical line terminal 2402 is configured to implement the apparatus for virtualizing a passive optical network provided by any one of embodiments in FIG. 11 to FIG. 14, which may include the apparatus for virtualizing a passive optical network provided by any one of the embodiments in FIG. 11 to FIG. 14 or functional modules/units in the apparatus, the optical network unit 2405 may be the optical network unit provided by any one of the embodiments in FIG. 18 to FIG. 21, the arrayed waveguide grating 2403 is separately connected to the optical line terminal 2402 and the optical splitter 2404 by using an optical fiber, and the optical splitter 2404 is connected to the optical network unit 2405 by using an optical fiber.

The upper management and control module 2401 is configured to create a virtualized passive optical network, and send a virtualized passive optical network creation message to the optical line terminal 2402, where the virtualized passive optical network creation message includes an identifier VPON ID of a to-be-created virtualized passive optical network and at least one wavelength flow identifier λ-flow ID, the VPON ID is used to identify the virtualized passive optical network foamed by a virtualized optical line terminal and the at least one optical network unit 2405, and the λ-flow ID is used to identify a wavelength flow used for bidirectional communication between the optical line terminal 2402 and the optical network unit 2405.

The optical line terminal 2402 is configured to receive the virtualized passive optical network creation message sent by the upper management and control module 2401, establish, according to the VPON ID and the at least one λ-flow ID, a communication connection relationship with the at least one optical network unit 2405 in the virtualized passive optical network identified by the VPON ID, and deliver the virtualized passive optical network creation message to the optical network unit 2405.

The arrayed waveguide grating 2403 is configured to multiplex, in a downlink direction, the wavelength flow used for bidirectional communication between the optical line terminal 2402 and the optical network unit 2405 and then inject the multiplexed wavelength flow to the optical splitter 2404, and demultiplex, in an uplink direction, the wavelength flow used for bidirectional communication between the optical line terminal 2402 and the optical network unit 2405 and then send the demultiplexed wavelength flow to the optical line terminal 2402.

The optical splitter 2404 is configured to broadcast, in the downlink direction, the wavelength flow injected by the arrayed waveguide grating 2403, and send, in the uplink direction, a wavelength flow tuned by the optical network unit 2405 to the arrayed waveguide grating 2403.

The optical network unit 2405 is configured to receive the virtualized passive optical network creation message delivered by the optical line terminal 2402, establish a λ-flow entry according to the VPON ID and the λ-flow ID, and report registration information to the optical line terminal 2402 in the virtualized passive optical network identified by the VPON ID, to establish a communication connection relationship with the optical line terminal 2402, where the registration information includes a λ-flow entry, and the λ-flow entry includes an optical network unit identifier and the λ-flow ID.

In the passive optical network virtualization system shown in FIG. 24, a physical optical line terminal 2402 may be identified by its transceiver (TRansceiver, TRx), that is, the optical line terminal 2402 corresponds to a transceiver in a one-to-one manner, and each transceiver corresponds to one MAC module, to form one PON port. When MAC corresponding to multiple transceivers shares one virtualized MAC (Virtualized MAC, VMAC) module, the optical line terminals 2402 corresponding to the multiple transceivers are manifested as one virtualized optical line terminal in the upper management and control module 2401, and the virtualized optical line terminal and the at least one optical network unit 2405 form one VPON.

Figure 25:
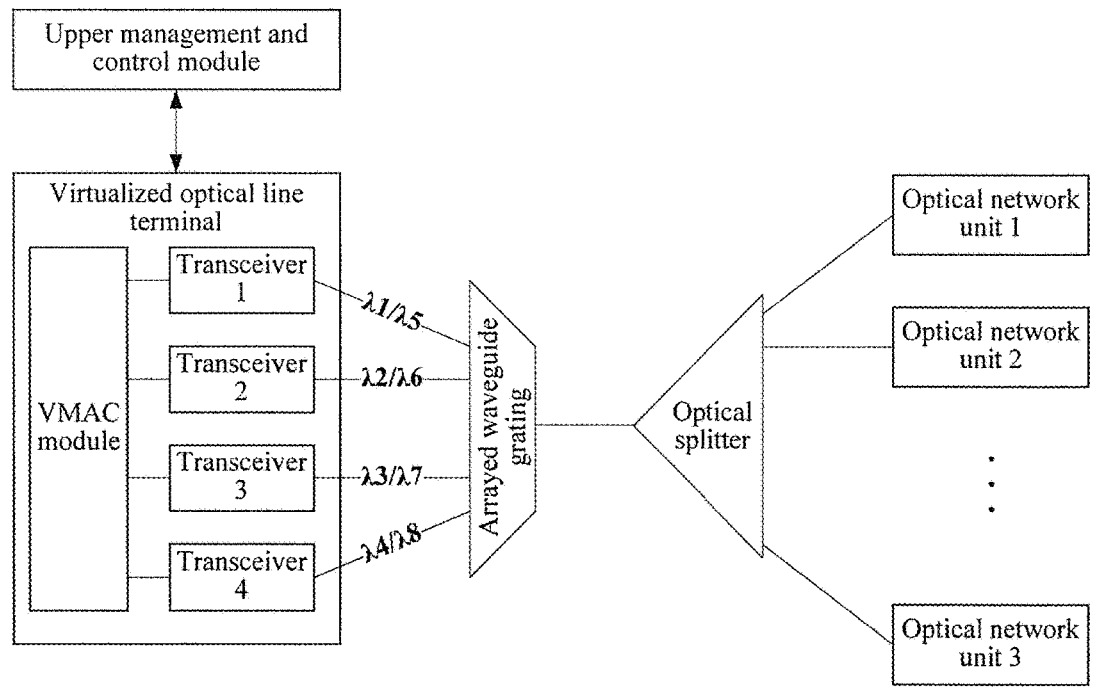
FIG. 25 is a schematic structural diagram of a passive optical network virtualization system according to another embodiment of the present invention.

An example in which four optical line terminals 2402 are manifested as one virtualized optical line terminal in the upper management and control module 2401 is used in the following to describe the passive optical network virtualization system shown in FIG. 24. Refer to FIG. 25, which shows a passive optical network virtualization system according to another embodiment of the present invention. In the passive optical network virtualization system shown in FIG. 25, four transceivers whose numbers are respectively a transceiver 1 (TRx#1), a transceiver 2 (TRx#2), transceiver 3 (TRx#3), and transceiver 4 (TRx#4) respectively correspond to four optical line terminals 2402 shown in FIG. 24; λ-flow IDs identify eight wavelength flows, which are separately: a downlink wavelength flow λ1 and an uplink wavelength flow λ5 of the TRx#1, a downlink wavelength flow λ2 and an uplink wavelength flow λ6 of the TRx#2, a downlink wavelength flow λ3 and an uplink wavelength flow λ7 of the TRx#3, and a downlink wavelength flow λ4 and an uplink wavelength flow λ8 of the TRx#4; and a VMAC module makes the optical line terminals 2402 corresponding to the multiple transceivers are manifested as one virtualized optical line terminal in the upper management and control module. In n optical network units 2405 shown in FIG. 24, each optical network unit includes one virtualized MAC (VMAC) module and one wavelength tunable (λ-tunable) transceiver.

In the passive optical network virtualization system shown in FIG. 25, in the downlink direction, four downlink wavelength flows λ1, λ2, λ3, and λ4 of four transceivers of the optical line terminals in the virtualized optical line terminal are multiplexed by using one arrayed waveguide grating (Arrayed Waveguide Grating, AWG), to enter a feeder fiber, and an optical splitter (Splitter) broadcasts the downlink wavelength flows λ1, λ2, λ3, and λ4. All optical network units can receive the downlink wavelength flows λ1, λ2, λ3, and λ4, and a wavelength tunable transceiver in an optical network unit may receive, in the downlink direction, any wavelength flow of the wavelength flows λ1, λ2, λ3, and λ4. In the uplink direction, an emission wavelength of the wavelength tunable transceiver in the optical network unit may be tuned to any wavelength flow of the uplink wavelength flow λ5 of the TRx#1, the uplink wavelength flow λ6 of the TRx#2, the uplink wavelength flow λ7 of the TRx#3, and the uplink wavelength flow λ8 of the TRx#4, then passes through an optical splitter and a feeder fiber, to reach the arrayed waveguide grating for demultiplexing, and the four uplink wavelengths are respectively sent to corresponding transceivers in the optical line terminal. The VMAC module may be software-defined to different operation modes, such as a P2MP PON operation mode (such as an EPON or a GPON), a P2P GE operation mode, or a 10GE operation mode. The VPON may perform graphical control and management by using the upper management and control module, and the upper management and control module communicates with the VPON through a network standard control interface (such as an Openflow interface).

Figure 26:
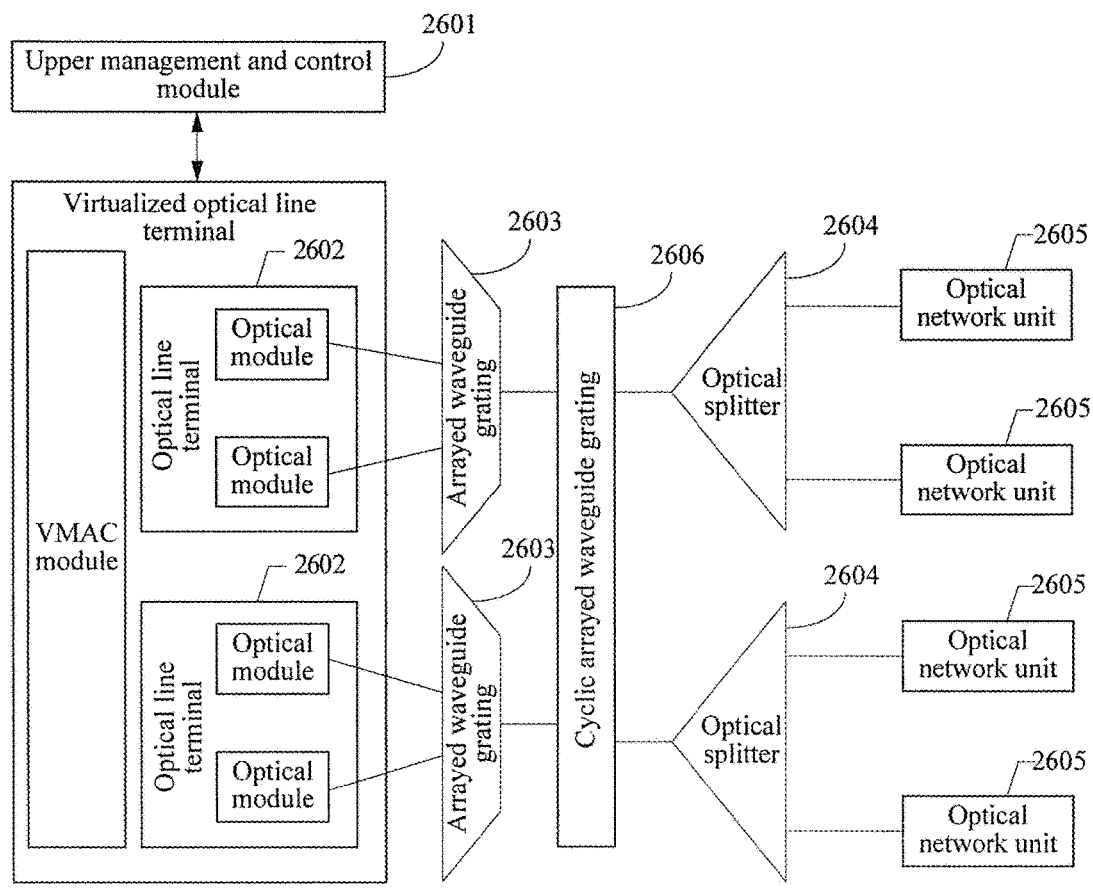
FIG. 26 is a schematic structural diagram of a passive optical network virtualization system according to another embodiment of the present invention.

FIG. 24 and FIG. 25 are examples of a relatively simple passive optical network virtualization system. In this embodiment of the present invention, all ONUs of all ODNs may be further created to one large VPON, that is, ONUs in multiple physically separated ODNs may also belong to one VPON. By using the large VPON, one overall view is formed, and by uniformly controlling and allocating resources according to the overall view, bandwidth and hardware resources among multiple PONs can be shared. Refer to FIG. 26, which is a schematic structural diagram of a passive optical network virtualization system according to another embodiment of the present invention. For ease of description, only parts related to this embodiment of the present invention are shown. The passive optical network virtualization system shown in FIG. 26 includes an upper management and control module 2601, at least two optical line terminals 2602, at least two arrayed waveguide gratings 2603, at least two optical splitters 2604, at least two optical network units 2605, and at least one cyclic arrayed waveguide grating 2606, where the optical line terminal 2602 is configured to implement the apparatus for virtualizing a passive optical network provided by any one of the embodiments in FIG. 11 and FIG. 15 to FIG. 17, and may include the apparatus for virtualizing a passive optical network provided by any one of the embodiments in FIG. 11 and FIG. 15 to FIG. 17 or functional modules/units in the apparatus, the optical network unit 2605 may be the optical network unit provided by any one of the embodiments in FIG. 18, FIG. 22, and FIG. 23, the at least two optical line terminals 2602 include at least two optical modules, optical modules in the at least two optical modules are connected to arrayed waveguide gratings in the at least two arrayed waveguide gratings 2603 by using an optical fiber, the cyclic arrayed waveguide grating 2606 is separately connected to the arrayed waveguide grating 2603 and the optical splitter 2604 by using an optical fiber, and the at least two optical splitters 2604 are separately connected to the at least two optical network units 2605 by using an optical fiber.

The upper management and control module 2601 is configured to create a virtualized passive optical network, and send a virtualized passive optical network creation message to the optical line terminal 2602, where the virtualized passive optical network creation message includes an identifier VPON ID of a to-be-created virtualized passive optical network, a wavelength flow identifier λ-flow ID, an optical module identifier M ID, and an optical distribution network identifier ODN ID, the VPON ID is used to identify the virtualized passive optical network formed by a virtualized optical line terminal and at least one optical network unit 2602, the λ-flow ID is used to identify a wavelength flow used for bidirectional communication between the optical line terminal 2602 and the optical network unit 2605, the M ID is used to identify an optical module to which a wavelength flow identified by the λ-flow ID belongs, and the ODN ID is used to identify an optical distribution network to which the wavelength flow identified by the λ-flow ID belongs.

The optical line terminal 2602 is configured to receive the virtualized passive optical network creation message sent by the upper management and control module 2601, establish, according to the VPON ID, the λ-flow ID, the M ID and the ODN ID, a communication connection relationship with the at least one optical network unit 2605 in the virtualized passive optical network identified by the VPON ID, the M ID, and the ODN ID, and deliver the virtualized passive optical network creation message to the optical network unit 2605.

The arrayed waveguide grating 2603 is configured to multiplex, in a downlink direction, the wavelength flow used for bidirectional communication between the optical line terminal 2602 and the optical network unit 2605 and then inject the multiplexed wavelength flow to the cyclic arrayed waveguide grating 2606, and demultiplex, in an uplink direction, the wavelength flow from the cyclic arrayed waveguide grating 2606 and then send the demultiplexed wavelength flow to the optical line terminal 2602.

The cyclic arrayed waveguide grating 2606 is configured to separately allocate, in the downlink direction, wavelength flows from the at least two arrayed waveguide gratings 2603 to the at least two optical splitters 2604, and separately allocate, in the uplink direction, the wavelength flow used for bidirectional communication between the optical line terminal 2602 and the optical network unit 2605 to the at least two optical modules.

The optical splitter 2604 is configured to broadcast, in the downlink direction, the wavelength flow injected by the arrayed waveguide grating 2603, and send, in the uplink direction, a wavelength flow tuned by the optical network unit 2605 to the arrayed waveguide grating 2603.

The optical network unit 2605 is configured to receive the virtualized passive optical network creation message delivered by the optical line terminal 2602, establish a λ-flow entry according to the VPON ID, the λ-flow ID, the M ID, and the ODN ID, and report registration information to the optical line terminal 2602 in the virtualized passive optical network identified by the VPON ID, the M ID, and the ODN ID, to establish a communication connection relationship with the optical line terminal 2602, where the registration information includes a λ-flow entry, and the λ-flow entry includes an optical network unit identifier, the λ-flow ID, the M ID, and the ODN ID.

Figure 27:
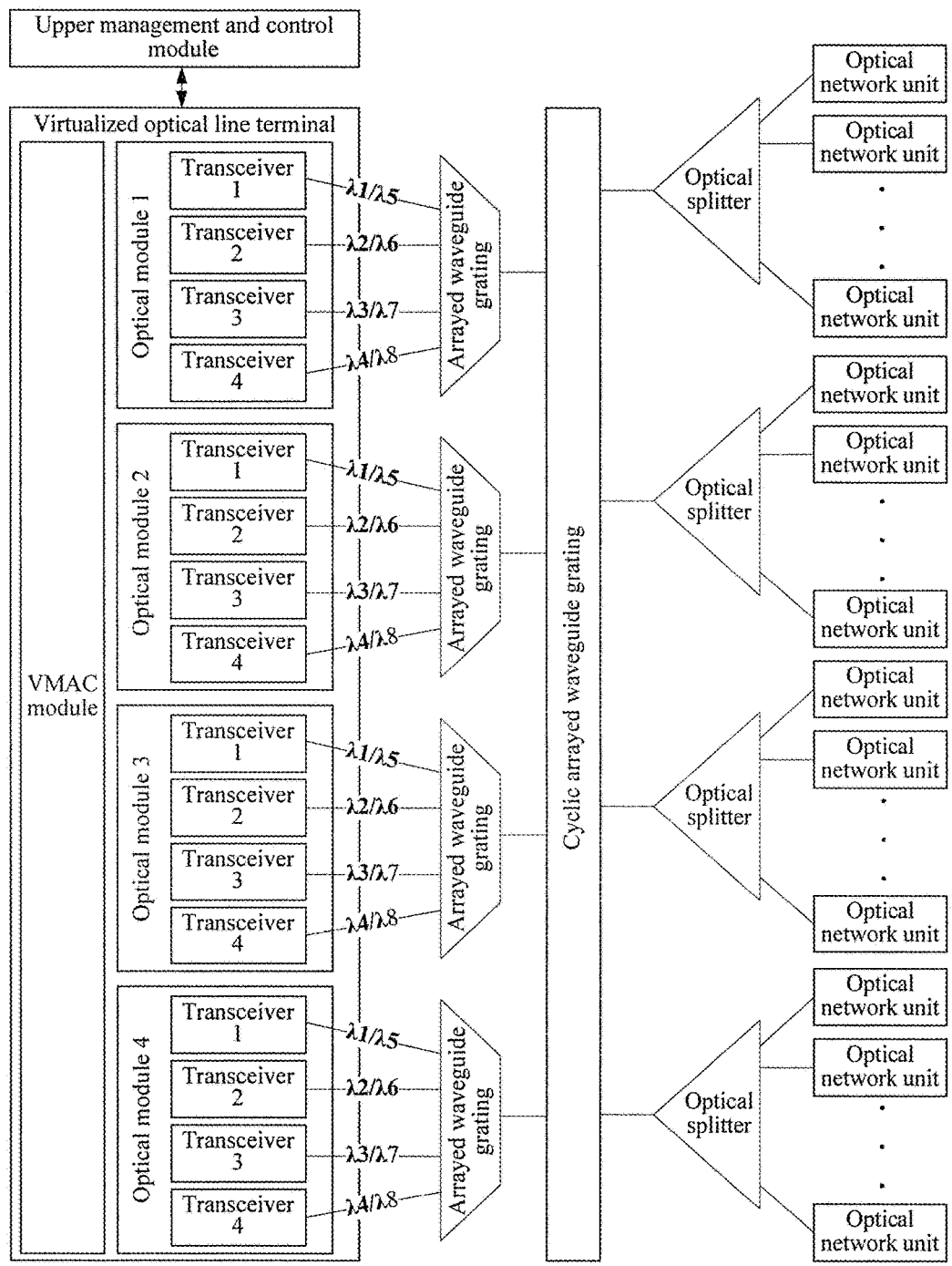
FIG. 27 is a schematic structural diagram of a passive optical network virtualization system according to another embodiment of the present invention.

An example in which four optical modules with a same structure (which are separately numbered M1, M2, M3, and M4), each optical module includes 4 transceivers, four transceivers whose numbers in each optical module are separately a transceiver 1 (TRx#1), a transceiver 2 (TRx#2), a transceiver 3 (TRx#3), and a transceiver 4 (TRx#4) separately correspond to four optical line terminals 2602 shown in FIG. 26 is used in the following to describe the passive optical network virtualization system shown in FIG. 26. Refer to FIG. 27, which shows a passive optical network virtualization system according to another embodiment of the present invention. In the passive optical network virtualization system shown in FIG. 27, λ-flow IDs identify eight wavelength flows, which are separately: a downlink wavelength flow λ1 and an uplink wavelength flow λ5 of the TRx#1, a downlink wavelength flow λ2 and an uplink wavelength flow λ6 of the TRx#2, a downlink wavelength flow λ3 and an uplink wavelength flow λ7 of the TRx#3, and a downlink wavelength flow λ4 and an uplink wavelength flow λ8 of the TRx#4; and the four optical modules with the same structure are uniformly controlled by one VMAC module, and the VMAC module makes the optical line terminals 2602 corresponding to the multiple transceiver be manifested as one virtualized optical line terminal in the upper management and control module 2601.

For the passive optical network virtualization system shown in FIG. 26, in the downlink direction, a downlink wavelength flow λ1, a downlink wavelength flow λ2, a downlink wavelength flow λ3, and a downlink wavelength flow λ4 of each optical module are multiplexed by using an arrayed waveguide grating and then are sent to one port of a 4×4 cyclic arrayed waveguide grating, and then, the 4×4 cyclic arrayed waveguide grating separately allocates the λ1, the λ2, the λ3 and the λ4 to four different ODNs, so that each ODN includes four different wavelengths, and the four wavelengths are from different optical modules. For example, after four wavelengths of an optical module M1 passes through the 4×4 cyclic arrayed waveguide grating, the λ1 is allocated to an ODN1, the λ2 is allocated to an ODN2, the λ3 is allocated to an ODN3, and the λ4 is allocated to an ODN4; after four wavelengths of an optical module M2 passes through the 4×4 cyclic arrayed waveguide grating, the λ1 is allocated to the ODN2, the λ2 is allocated to the ODN3, the λ3 is allocated to the ODN4, and the λ4 is allocated to the ODN1; after four wavelengths of an optical module M3 passes through the 4×4 cyclic arrayed waveguide grating, the λ1 is allocated to the ODN3, the λ2 is allocated to the ODN4, the λ3 is allocated to the ODN1, and the λ4 is allocated to the ODN2; and after four wavelengths of an optical module M4 passes through the 4×4 cyclic arrayed waveguide grating, the λ1 is allocated to the ODN4, the λ2 is allocated to the ODN1, the λ3 is allocated to the ODN2, and the λ4 is allocated to the ODN3. In this way, each ODN includes four wavelengths λ1, λ2, λ3 and λ4, and the four downlink wavelengths are from different optical modules. After the wavelengths enter different ODNs, an optical splitter (Splitter) broadcasts the downlink wavelengths, and all the ONUs can receive the four downlink wavelengths λ1, λ2, λ3 and λ4. A transceiver of the ONU is a wavelength tunable (λ-tunable) transceiver, and may receive any wavelength of the λ1, the λ2, the λ3 and the λ4 in the downlink direction. In the uplink direction, an emission wavelength of a wavelength tunable transceiver in an ONU of a different ODN may be tuned to any wavelength of λ5, λ6, λ7 and λ8, and then, passes through an optical splitter and a feeder fiber, to reach the 4×4 cyclic arrayed waveguide grating. In an allocation method same as that at downlink, four wavelengths in each ODN are allocated by the 4×4 cyclic arrayed waveguide grating to different uplink output ports, so that each output port includes four wavelengths, and the four wavelengths are from different ODNs. Then, the arrayed waveguide grating performs demultiplexing, and the four uplink wavelengths are separately sent to transceivers corresponding to the four optical modules.

It should be noted that, content such as information exchange between modules/units of the foregoing apparatus and execution processes are based on the same conception as the method embodiments of the present invention, and produces same technical effects as the method embodiments of the present invention. For the specific content, reference may be made to the description in the method embodiments of the present invention, and details are not described herein again.

A person of ordinary skill in the art may understand that all or some of the steps in the methods in the foregoing embodiments, for example, one or more or all of the following methods may be implemented by a program instructing relevant hardware:

Method 1: Receive a virtualized passive optical network creation message sent by an upper management and control module, where the virtualized passive optical network creation message includes an identifier VPON ID of a to-be-created virtualized passive optical network and at least one wavelength flow identifier λ-flow ID, the VPON ID is used to identify the virtualized passive optical network formed by a virtualized optical line terminal and the at least one optical network unit, and the λ-flow ID is used to identify one wavelength flow; and establish, according to the VPON ID and the at least one λ-flow ID, a communication connection relationship with the at least one optical network unit in the virtualized passive optical network identified by the VPON ID.

Method 2: The optical network unit receives a delivered virtualized passive optical network creation message, where the virtualized passive optical network creation message includes an identifier VPON ID of a to-be-created virtualized passive optical network and at least one wavelength flow identifier λ-flow ID; and the optical network unit establishes a λ-flow entry according to the VPON ID and the λ-flow ID, and reports registration information to an optical line terminal in the virtualized passive optical network identified by the VPON ID, to establish a communication connection relationship with the optical line terminal, where the registration information includes a λ-flow entry, and the λ-flow entry includes the optical network unit identifier and the λ-flow ID.

A person of ordinary skill in the art may understand that all or some of the steps in the methods in the embodiments may be implemented by a program instructing relevant hardware. The program may be stored in a computer readable storage medium. The storage medium may include: a read-only memory (ROM, Read-Only Memory), a random access memory (RAM, Random Access Memory), a magnetic disk, an optical disc, or the like.

The method and the apparatus for virtualizing a passive optical network, and the passive optical network virtualization system provided by the embodiments of the present invention are described in detail above. In this specification, specific examples are used to describe the principle and implementation manners of the present invention, and the description of the embodiments is only intended to help understand the method and core ideas of the present invention. At the same time, a person of ordinary skill in the art may make variations and modifications to the present invention in terms of the specific implementation manners and application scopes according to the ideas of the present invention. Therefore, the content of the specification shall not be construed as a limitation to the present invention.

What is claimed is:

1. A method for virtualizing a passive optical network, the method comprising:
   receiving a virtualized passive optical network (VPON) creation message comprising an identifier (VPON ID) of a to-be-created virtualized passive optical network and at least one wavelength flow identifier λ-flow ID, the VPON ID is used to identify the virtualized passive optical network formed by a virtualized optical line terminal and at least one optical network unit, and the λ-flow ID is used to identify one wavelength flow;
   sending the virtualized passive optical network creation message to the at least one optical network unit;
   receiving registration information that is registered in an optical line terminal and returned by the at least one optical network unit, wherein the registration information comprises a wavelength flow λ-flow entry, and the λ-flow entry comprises an optical network unit identifier and the λ-flow ID; and
   establishing a first registration mapping table according to the VPON ID and the λ-flow entry, wherein the first registration mapping table comprises the VPON ID and at least one λ-flow entry.

2. The method according to claim 1, further comprising:
   forwarding a downlink service flow or forwarding an uplink service flow;
   wherein forwarding a downlink service flow comprises:
      receiving an Ethernet frame, wherein the Ethernet frame carries a first virtual local area network identifier,
      querying a first virtualized passive optical network mapping table according to the first virtual local area network identifier, wherein an entry of the first virtualized passive optical network mapping table comprises a virtual local area network identifier, and a VPON ID and a transceiver identifier that correspond to the virtual local area network identifier, and
      when a first virtualized passive optical network identifier corresponding to the first virtual local area network identifier is found, encapsulating the Ethernet frame into a gigabit passive optical network encapsulation mode (GEM) frame and then sending the GEM frame to an optical network unit through a PON port corresponding to a first transceiver identifier, wherein a frame header of the GEM frame comprises the first virtualized passive optical network identifier; and
   wherein forwarding an uplink service flow comprises:
      receiving a GEM frame, wherein the GEM frame carries a second virtualized passive optical network identifier,
      querying a first virtualized passive optical network mapping table according to the second virtualized passive optical network identifier, and
      when the second virtualized passive optical network identifier is found in the first virtualized passive optical network mapping table, decapsulating the GEM frame.

3. The method according to claim 1, wherein:
   the VPON creation message further comprises an optical module identifier (M ID) and an optical distribution network identifier (ODN ID), wherein the M ID is used to identify an optical module to which a wavelength flow identified by the λ-flow ID belongs, and the ODN ID is for identifying an optical distribution network to which the wavelength flow identified by the λ-flow ID belongs; and
   establishing, according to the VPON ID and the at least one λ-flow ID, a communication connection relationship with the at least one optical network unit in the virtualized passive optical network identified by the VPON ID comprises:
      sending, to the at least one optical network unit, the virtualized passive optical network creation message that carries the M ID,
      receiving registration information that is registered in the virtualized optical line terminal and returned by the at least one optical network unit, wherein the registration information comprises a wavelength flow λ-flow entry, and the λ-flow entry comprises the ODN ID and the M ID, and establishing a second registration mapping table according to the VPON ID and the λ-flow entry, wherein the second registration mapping table comprises the VPON ID and at least one λ-flow entry.

4. The method according to claim 1, wherein:

the VPON creation message further comprises an optical module identifier (M ID) and an optical distribution network identifier (ODN ID), the M ID for identifying an optical module to which a wavelength flow identified by the λ-flow ID belongs, and the ODN ID for identifying an optical distribution network to which the wavelength flow identified by the λ-flow ID belongs; and after establishing, according to the VPON ID and the at least one λ-flow ID, a communication connection relationship with the at least one optical network unit in the virtualized passive optical network identified by the VPON ID, the method further comprises:

forwarding a downlink service flow or forwarding an uplink service flow, wherein forwarding a downlink service flow comprises:

receiving an Ethernet frame, wherein the Ethernet frame carries a third virtual local area network identifier;

querying a second virtualized passive optical network mapping table according to the third virtual local area network identifier, wherein an entry of the second virtualized passive optical network mapping table comprises a virtual local area network identifier, (VLAN ID), and a VPON ID, a transceiver identifier TRx ID, an M ID and/or an ODN ID that corresponds to the VLAN ID, and comprises at least a VLAN ID, and a VPON ID and a TRx ID that correspond to the VLAN ID; and when a third virtualized passive optical network identifier and a third transceiver identifier that correspond to the third virtual local area network identifier are found, encapsulating the Ethernet frame into a gigabit passive optical network encapsulation mode (GEM) frame and then sending the GEM frame to an optical network unit through a PON port corresponding to the third transceiver identifier, wherein a frame header of the GEM frame comprises the third virtualized passive optical network identifier, and wherein forwarding an uplink service flow comprises:

receiving a GEM frame, wherein the GEM frame carries a fourth virtualized passive optical network identifier;

querying a second virtualized passive optical network mapping table according to the fourth virtualized passive optical network identifier; and when the fourth virtualized passive optical network identifier is found in the second virtualized passive optical network mapping table, decapsulating the GEM frame.

5. A method for virtualizing a passive optical network, the method comprising:

receiving, by an optical network unit, a delivered virtualized passive optical network (VPON) creation message comprising an identifier (VPON ID) of a to-be-created virtualized passive optical network and at least one wavelength flow identifier λ-flow ID;

establishing, by the optical network unit, a λ-flow entry according to the VPON ID and the λ-flow ID, and reporting registration information to an optical line terminal in the virtualized passive optical network identified by the VPON ID, to establish a communication connection relationship with the optical line terminal, wherein the registration information comprises a λ-flow entry, and the λ-flow entry comprises an optical network unit identifier and the λ-flow ID;

receiving an Ethernet frame, wherein the Ethernet frame carries a sixth virtual local area network identifier;

querying a third virtualized passive optical network mapping table according to the sixth virtual local area network identifier, wherein an entry of the third virtualized passive optical network mapping table comprises a VPON ID, and a gigabit passive optical network encapsulation mode (GEM) port identifier, an Ethernet port identifier, and a virtual local area network identifier VLAN ID that correspond to the VPON ID; and when a sixth virtualized passive optical network identifier corresponding to the sixth virtual local area network identifier is found in the third virtualized passive optical network mapping table, encapsulating the Ethernet frame into a GEM frame and then sending the GEM frame to an optical line terminal through a PON port, wherein a frame header of the GEM frame comprises the sixth virtualized passive optical network identifier.

6. The method according to claim 5, wherein:

the λ-flow entry further comprises an optical module identifier (M ID) and an optical distribution network identifier (ODN ID), the M ID for identifying an optical module to which a wavelength flow identified by the λ-flow ID belongs, and the ODN ID for identifying an optical distribution network to which the wavelength flow identified by the λ-flow ID belongs; and after registering, by the optical network unit, according to the VPON ID and the λ-flow ID, in an optical line terminal in the virtualized passive optical network identified by the VPON ID, to establish a communication connection relationship with the optical line terminal, the method further comprises:

receiving an Ethernet frame, wherein the Ethernet frame carries an eighth virtual local area network identifier, querying a fourth virtualized passive optical network mapping table according to the eighth virtual local area network identifier, wherein an entry of the fourth virtualized passive optical network mapping table comprises a VPON ID, and a gigabit passive optical network encapsulation mode (GEM) port identifier, an ODN ID, an Ethernet port identifier and/or a VLAN ID that corresponds to the VPON ID, and comprises at least a VPON ID, and a GEM port identifier, an Ethernet port identifier, and a VLAN ID that correspond to the VPON ID, and when an eighth virtualized passive optical network identifier corresponding to the eighth virtual local area network identifier is found in the fourth virtualized passive optical network mapping table, encapsulating the Ethernet frame into a GEM frame and then sending the GEM frame to an optical line terminal through a PON port, wherein a frame header of the GEM frame comprises the eighth virtualized passive optical network identifier.

7. An apparatus for virtualizing a passive optical network, the apparatus comprising:

a memory storage comprising instructions; and
one or more processors in communication with the memory, wherein the one or more processors execute the instructions to:
receive a virtualized passive optical network (VPON) creation message comprising an identifier (VPON ID) of a to-be-created VPON and at least one wavelength flow identifier λ-flow ID, the VPON ID for identifying the virtualized passive optical network formed by a virtualized optical line terminal and the at least one optical network unit, and the λ-flow ID for identifying one wavelength flow;
establish, according to the VPON ID and the at least one λ-flow ID, a communication connection relationship with the at least one optical network unit in the virtualized passive optical network identified by the VPON ID;
send the virtualized passive optical network creation message to the at least one optical network unit;
receive registration information that is registered in an optical line terminal and returned by the at least one optical network unit, wherein the registration information comprises a wavelength flow λ-flow entry, and the λ-flow entry comprises an optical network unit identifier and the λ-flow ID; and
establish a first registration mapping table according to the VPON ID and the λ-flow entry, wherein the first registration mapping table comprises the VPON ID and at least one λ-flow entry.

8. The apparatus according to claim 7, wherein the one or more processors execute the instructions to:
forward a downlink service flow,
receive an Ethernet frame, wherein the Ethernet frame carries a first virtual local area network identifier,
query a first virtualized passive optical network mapping table according to the first virtual local area network identifier, wherein an entry of the first virtualized passive optical network mapping table comprises a virtual local area network identifier (VLAN ID), and a VPON ID and a transceiver identifier TRx ID that correspond to the VLAN ID, and
when a first virtualized passive optical network identifier corresponding to the first virtual local area network identifier is found, encapsulate the Ethernet frame into a gigabit passive optical network encapsulation mode (GEM) frame and then send the GEM frame to an optical network unit through a PON port corresponding to a first transceiver identifier, wherein a frame header of the GEM frame comprises the first virtualized passive optical network identifier;
or
forward an uplink service flow,
receive a GEM frame, wherein the GEM frame carries a second virtualized passive optical network identifier,
query the first virtualized passive optical network mapping table according to the second virtualized passive optical network identifier, and
when the second virtualized passive optical network identifier is found in the first virtualized passive optical network mapping table, decapsulate the GEM frame.

9. The apparatus according to claim 7, wherein:
the VPON creation message further comprises an optical module identifier (M ID) and an optical distribution network identifier (ODN ID), the M ID for identifying an optical module to which a wavelength flow identified by the λ-flow ID belongs, and the ODN ID for identifying an optical distribution network to which the wavelength flow identified by the λ-flow ID belongs; and
the one or more processors execute the instructions to:
send, to the at least one optical network unit, the VPON creation message that carries the M ID,
receive registration information that is registered in the virtualized optical line terminal and returned by the at least one optical network unit, wherein the registration information comprises a wavelength flow λ-flow entry, and the λ-flow entry comprises the ODN ID and the M ID, and
establish a second registration mapping table according to the VPON ID and the λ-flow entry, wherein the second registration mapping table comprises the VPON ID and at least one λ-flow entry.

10. The apparatus according to claim 7, wherein:
the virtualized passive optical network creation message further comprises an optical module identifier (M ID) and an optical distribution network identifier (ODN ID), the M ID for identifying an optical module to which a wavelength flow identified by the λ-flow ID belongs, and the ODN ID for identifying an optical distribution network to which the wavelength flow identified by the λ-flow ID belongs; and
the one or more processors execute the instructions to:
forward a downlink service flow, wherein to forward the downlink service flow, the one or more processors execute the instructions to:
receive an Ethernet frame, wherein the Ethernet frame carries a third virtual local area network identifier;
query a second virtualized passive optical network mapping table according to the third virtual local area network identifier, wherein an entry of the second virtualized passive optical network mapping table comprises a virtual local area network identifier (VLAN ID), and a VPON ID, a transceiver identifier TRx ID, an M ID and/or an ODN ID that corresponds to the VLAN ID, and comprises at least a VLAN ID, and a VPON ID and a TRx ID that correspond to the VLAN ID; and
when a third virtualized passive optical network identifier and a third transceiver identifier that correspond to the third virtual local area network identifier are found, encapsulate the Ethernet frame into a GEM frame and then send the GEM frame to an optical network unit through a PON port corresponding to the third transceiver identifier, wherein a frame header of the GEM frame comprises the third virtual passive optical network identifier,
or
forward am uplink service flow,
receive a gigabit passive optical network encapsulation mode (GEM) frame, wherein the GEM frame carries a fourth virtualized passive optical network identifier;
query a second virtualized passive optical network mapping table according to the fourth virtualized passive optical network identifier; and
when the fourth virtualized passive optical network identifier is found in the second virtualized passive optical network mapping table, decapsulate the GEM frame.

11. An apparatus for virtualizing a passive optical network, the apparatus comprising:

a memory storage comprising instructions; and
one or more processors in communication with the memory, wherein the one or more processors execute the instructions to:
  receive a delivered virtualized passive optical network (VPON) creation message comprising a VPON identifier (VPON ID) of a to-be-created VPON and at least one wavelength flow identifier λ-flow ID,
  establish a λ-flow entry according to the VPON ID and the λ-flow ID, and report registration information to an optical line terminal in the virtualized passive optical network identified by the VPON ID, to establish a communication connection relationship with the optical line terminal, wherein the registration information comprises a λ-flow entry, and the λ-flow entry comprises an optical network unit identifier and the λ-flow ID,
  receive an Ethernet frame, wherein the Ethernet frame carries a sixth virtual local area network identifier,
  query a third virtualized passive optical network mapping table according to the sixth virtual local area network identifier, wherein an entry of the third virtualized passive optical network mapping table comprises a VPON ID, and a gigabit passive optical network encapsulation mode (GEM) port identifier, an Ethernet port identifier, and a virtual local area network identifier (VLAN ID) that correspond to the VPON ID, and
  when a sixth virtualized passive optical network identifier corresponding to the sixth virtual local area network identifier is found in the third virtualized passive optical network mapping table, encapsulate the Ethernet frame into a GEM frame and then send the GEM frame to an optical line terminal through a PON port, wherein a frame header of the GEM frame comprises the sixth virtualized passive optical network identifier.

12. The apparatus according to claim 11, wherein:
the λ-flow entry further comprises an optical module identifier (M ID) and an optical distribution network identifier (ODN ID), the M ID for identifying an optical module to which a wavelength flow identified by the λ-flow ID belongs, and the ODN ID for identifying an optical distribution network to which the wavelength flow identified by the λ-flow ID belongs; and
the one or more processors execute the instructions to:
  receive an Ethernet frame, wherein the Ethernet frame carries an eighth virtual local area network identifier,
  query a fourth virtualized passive optical network mapping table according to the eighth virtual local area network identifier, wherein an entry of the fourth virtualized passive optical network mapping table comprises a VPON ID, and a gigabit passive optical network encapsulation mode (GEM) port identifier, an ODN ID, an Ethernet port identifier and/or a virtual local area network identifier (VLAN ID) that corresponds to the VPON ID, and comprises at least a VPON ID, and a GEM port identifier, an Ethernet port identifier, and a VLAN ID that correspond to the VPON ID, and
  when an eighth virtualized passive optical network identifier corresponding to the eighth virtual local area network identifier is found in the fourth virtualized passive optical network mapping table, encapsulate the Ethernet frame into a GEM frame and then send the GEM frame to an optical line terminal through a PON port, wherein a frame header of the GEM frame comprises the eighth virtualized passive optical network identifier.

* * * * *